United States Patent [19]

Murai et al.

[11] Patent Number: 4,968,089
[45] Date of Patent: Nov. 6, 1990

[54] FLEXIBLE TOP APPARATUS OF A VEHICLE

[75] Inventors: Takeshi Murai; Miyuki Tonegawa, both of Hiroshima, Japan

[73] Assignee: Mazda Motor Corporation, Hiroshima, Japan

[21] Appl. No.: 456,161

[22] Filed: Dec. 22, 1989

[30] Foreign Application Priority Data

Dec. 23, 1988 [JP] Japan .............................. 63-327162

[51] Int. Cl.$^5$ .............................................. B60J 7/12
[52] U.S. Cl. ..................................... 296/219; 296/124; 296/223; 296/224
[58] Field of Search ................ 296/219, 223, 224, 124

[56] References Cited

FOREIGN PATENT DOCUMENTS

| 0146723 | 8/1985 | Japan | 296/223 |
| 0251232 | 11/1987 | Japan | 296/223 |
| 0162326 | 7/1988 | Japan | 296/219 |

*Primary Examiner*—Dennis H. Pedder
*Attorney, Agent, or Firm*—Wegner & Bretschneider

[57] ABSTRACT

A roof panel connected to the vehicle body through at least a pair of left-hand and right-hand front pillars and a pair of left-hand and right-hand rear pillars is provided with a wide open roof aperture enclosed by a front header, a pair of left-hand and right-hand roof side rails and a rear header. To the pair of left-hand and right-hand rear pillars and the rear header is fixed a rear window glass panel. In order to close the roof aperture, there is provided a flexible top which is foldable in the longitudinal direction of the body. When the roof aperture is in a closed state, a forward end portion of the flexible top is in abutment with said front header, its left-hand and right-hand side end portions are abutted with the left-hand and right-hand roof side rails, and its rearward end portion is in abutment with the rear header. The flexible top in a folded state takes a first position located over a trunk lid, while it takes a second position when it is evacuated from the first position when the trunk lid is opened.

16 Claims, 23 Drawing Sheets

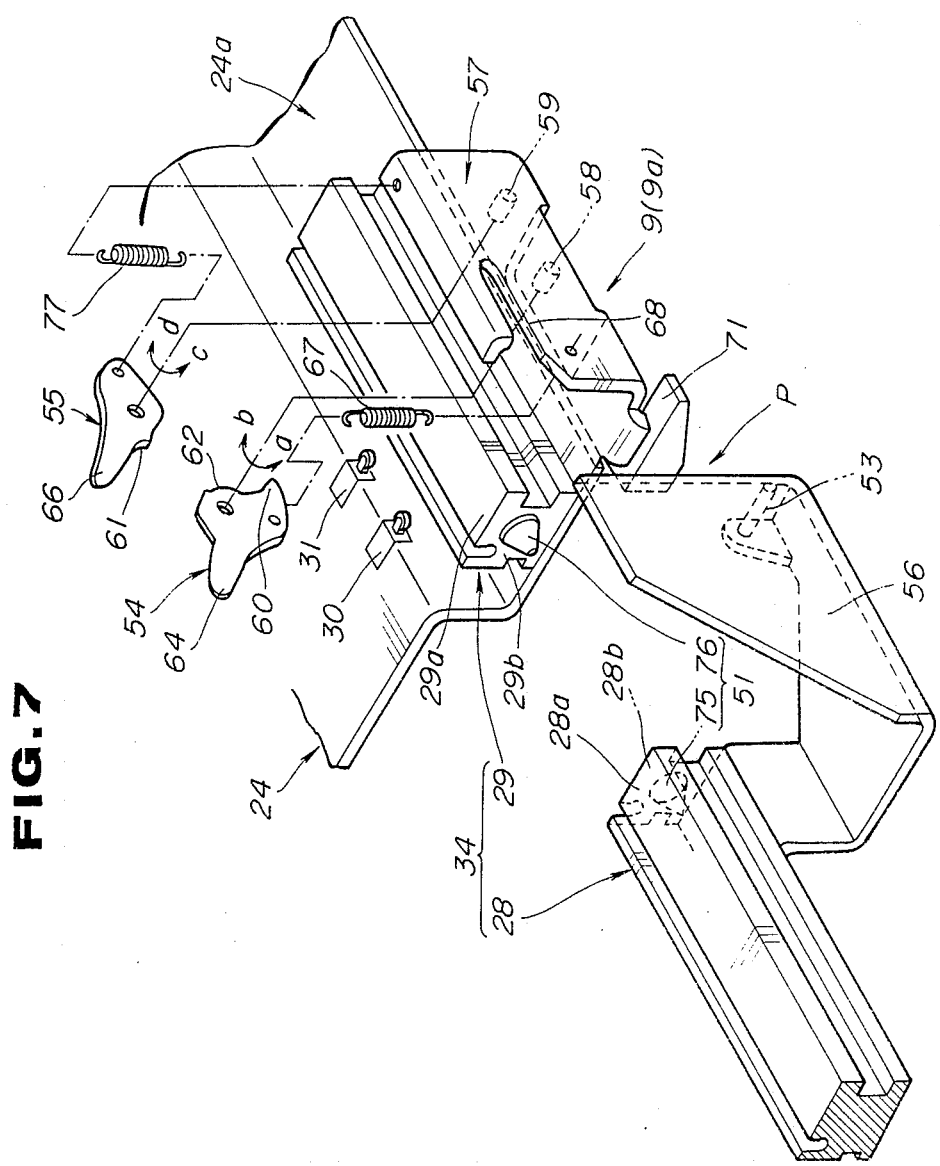

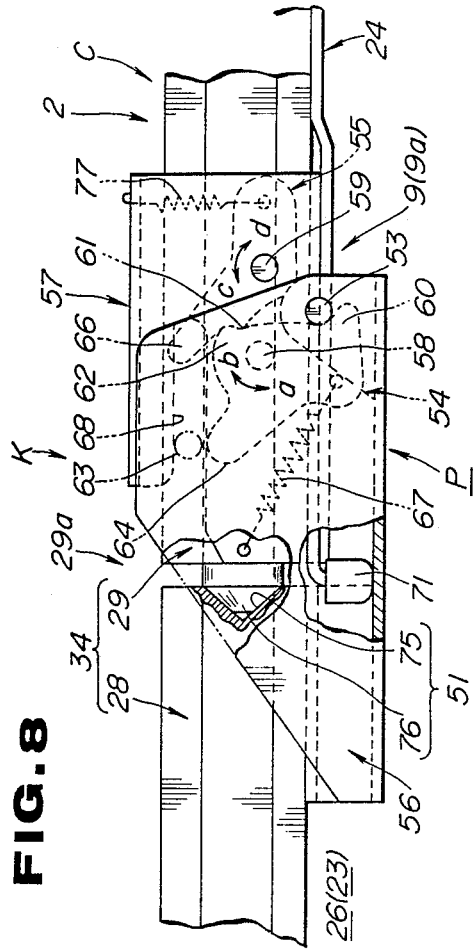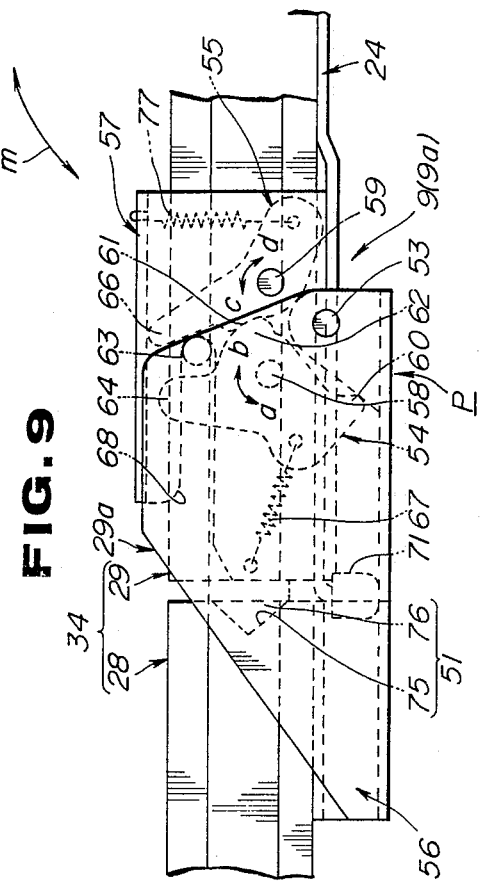

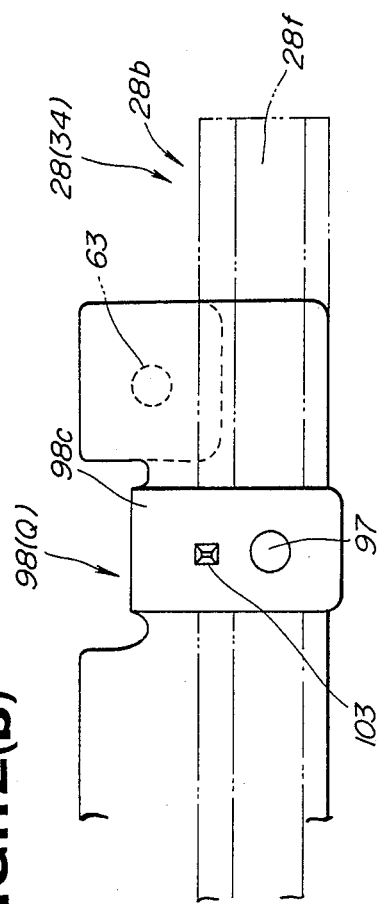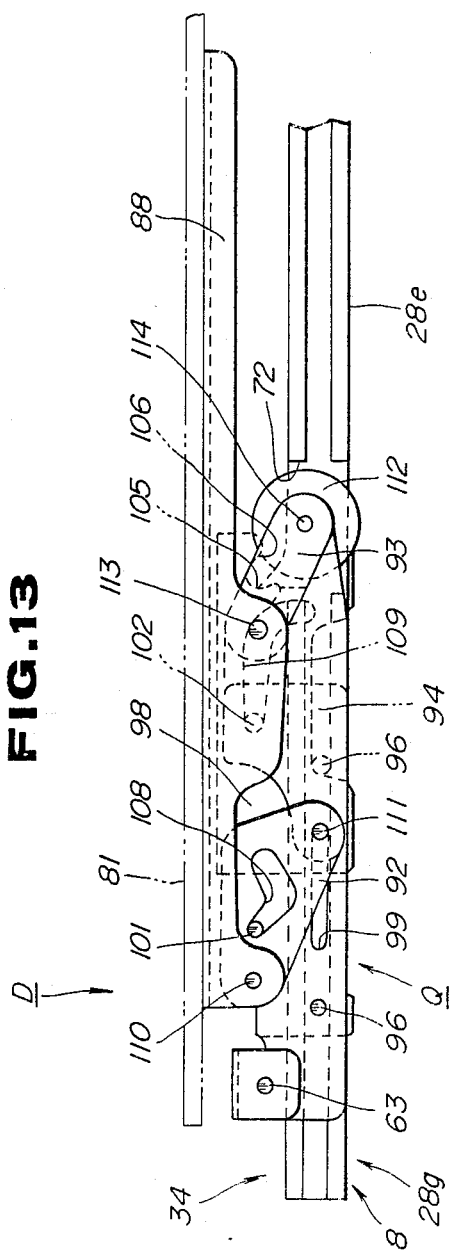

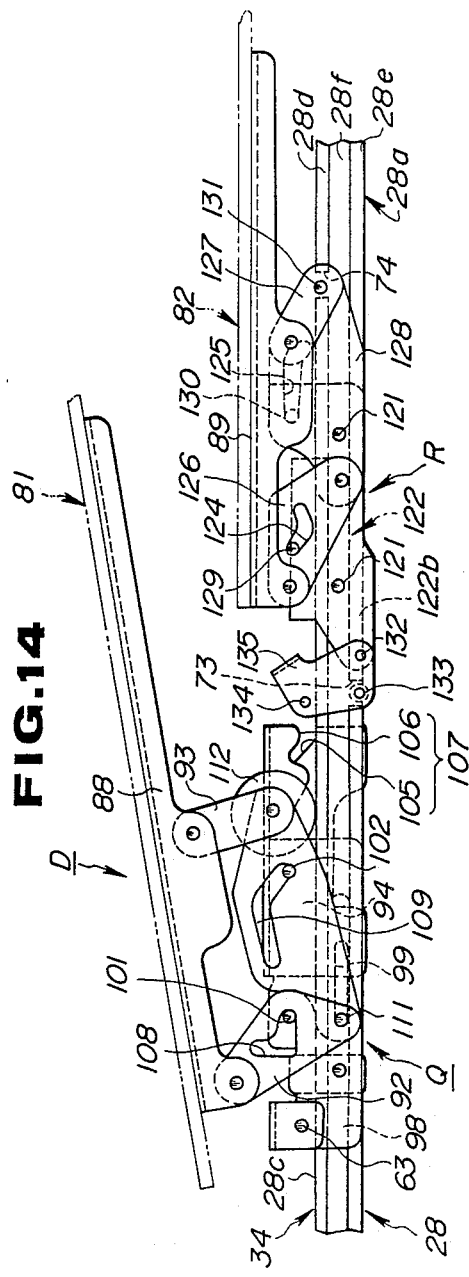
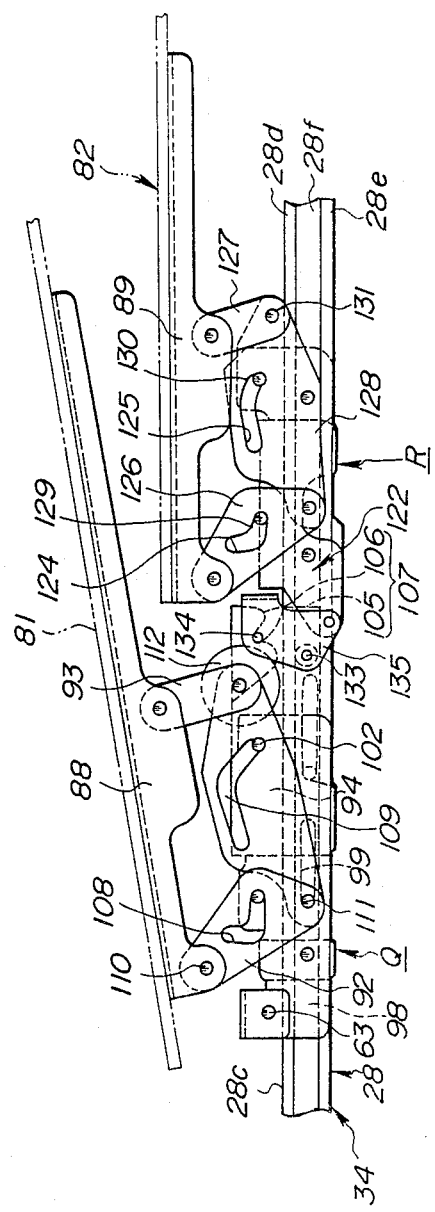

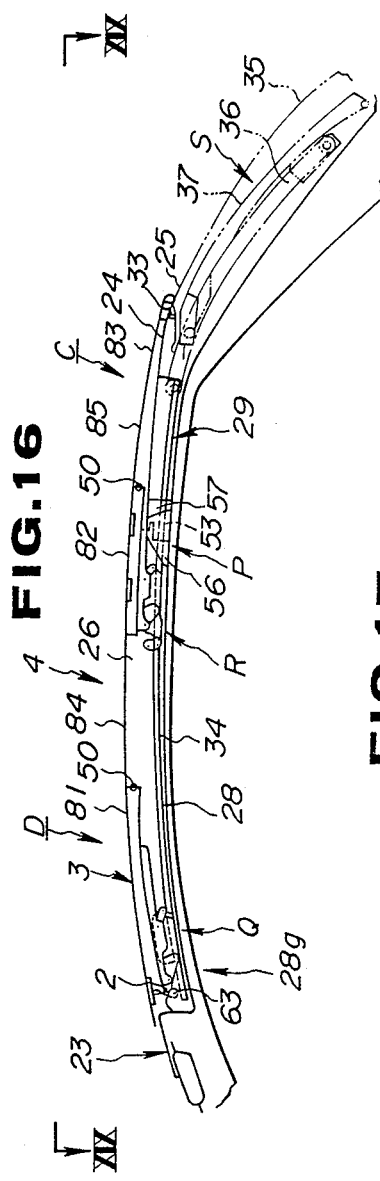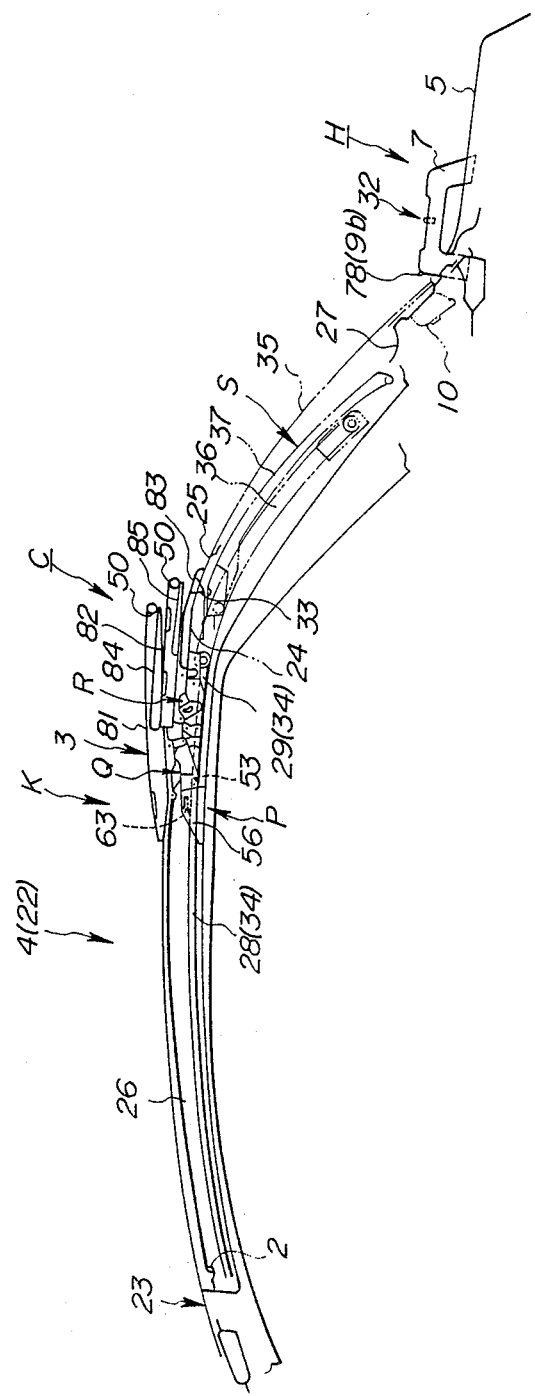

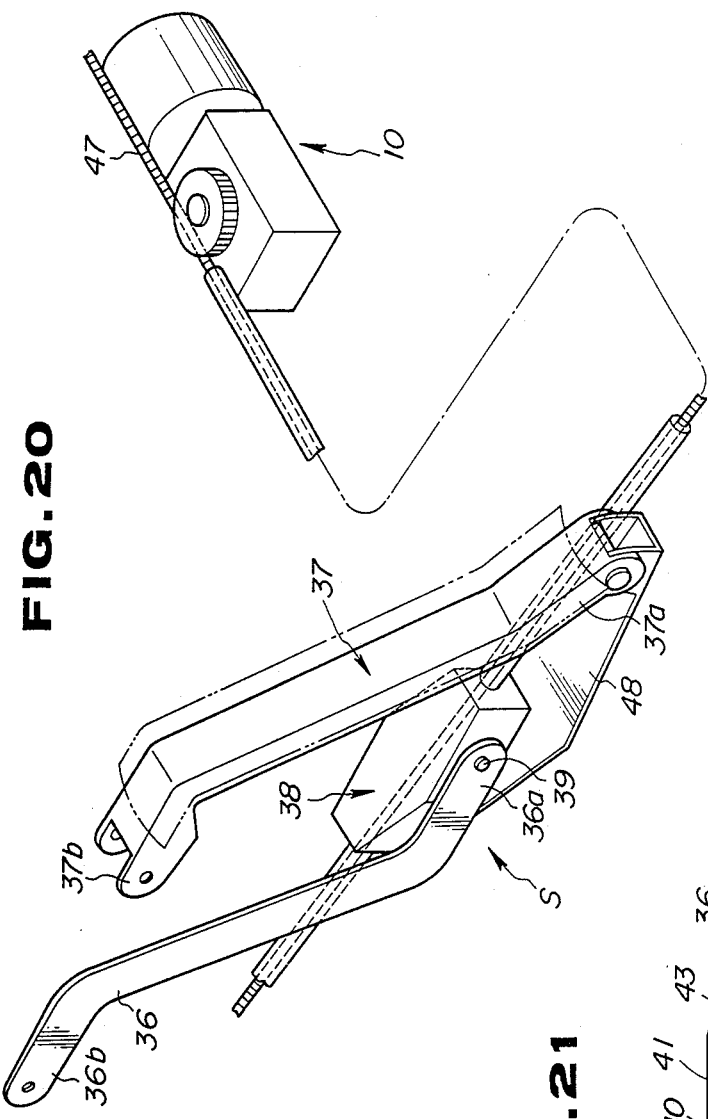
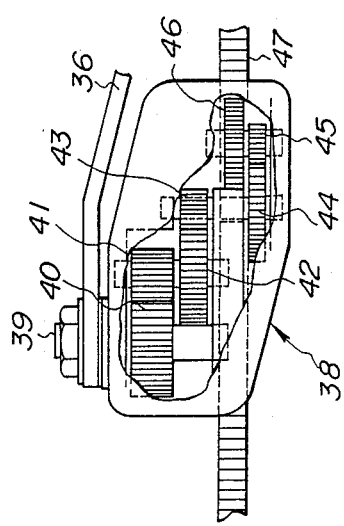

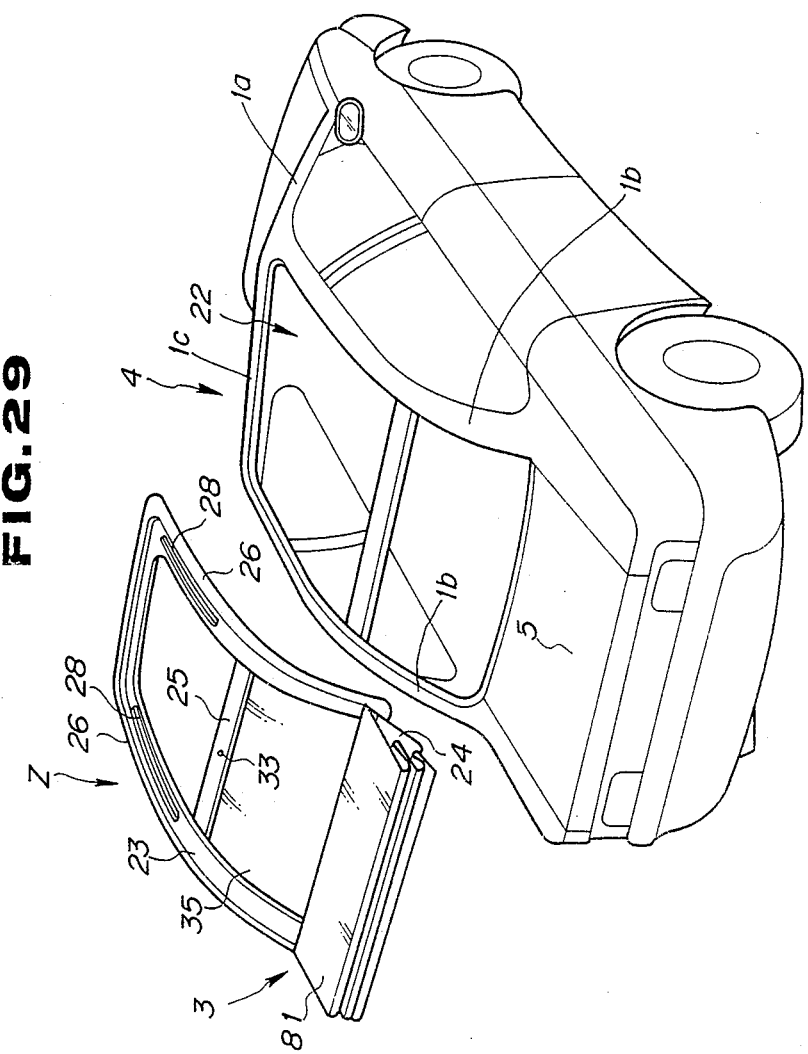

FLEXIBLE TOP APPARATUS OF A VEHICLE

BACKGROUND OF THE INVENTION

1. Field of the Invention

The present invention relates to a flexible top apparatus of a vehicle, as an automobile.

2. Description of Related Art

There is an automobile in which an upper portion of the vehicle chamber is open to thereby enjoy open air. The automobile of the open air type requires a member for covering its vehicle chamber to be used ween required or needed as when it rains. As such a member may be used a foldable flexible sheet, or a top.

Representative of such an automobile is one of full open type, which may be called a Cabriole type. An automobile of full open type as disclosed in U.S. Pat. No. 4,572,570 is basically of a type designed to allow an upper portion and a rearward upper portion of its vehicle chamber are fully open. More specifically, the automobile is provided with a front window glass panel, but no rear pillar is provided which is otherwise required in order to support the roof panel and a rearward end portion of the roof panel. Although the automobile of the full open type presents the advantage that its vehicle chamber can be widely open, it poses various difficulties at the same time that a rigidity of the vehicle body is hardly ensured because neither roof panel nor rear pillar are mounted, that the flexible top should be constructed in such a shape as covering the rearward upper portion of the vehicle chamber as well as the upper portion thereof when it is brought into a closed state, thus complicating its structure, and that a sealing performance of the flexible top is poor when it closes the vehicle chamber.

There is accordingly the increasing tendency that an automobile of a flexible top type which may be called of a canvas top type, as shown in U. K. Patent Specification No. 1,315,364. The automobile of flexible top type or canvas top type is such that only an aperture formed on a roof panel—such an aperture being referred to herein as "roof aperture"—is covered (closed) or uncovered (opened) with a flexible sheet so that this type may called a flexible top or a so-called flexible roof. The automobile of this flexible tope type is provided with a roof panel having a wide aperture, or roof aperture, connected to the vehicle body at least through front and rear pillars in such a manner that the roof panel opening is closed or opened with the flexible top. More specifically, the roof panel is of the type such that its whole middle portion is wide open as a roof aperture except its front header, a pair of its left-hand and right-hand side rails, and its rear header. In other words, the front and rear headers and the side rails constitute a four-sided periphery of the roof aperture and a front window glass panel is fixed with a pair of the left-hand and right-hand front pillars and the front header while a rear window glass panel is fixed with a pair of the left-hand and right-hand rear pillars and the rear header.

As the flexible top is in a closed state in which it fully closes the roof panel opening, the flexible top is designed such that its forward end is brought into abutment with the front header of the roof panel, its left-hand and right-hand side end portions are in abutment with the left-hand and right-hand roof side rails, and its rearward end is abutted with the rear header. This arrangement ensures a rigidity of the vehicle body to a sufficient extent because a framework of an upper circumference of the vehicle chamber is constituted by the left-hand and right-hand front pillars, front header, left-hand and right-hand roof side rails as well as rear header, such members being connected to each other. This structure further provides the advantage that it is simple because the flexible top is designed simply to open or close the roof panel opening. Furthermore, it presents the advantage that most common automobiles with a roof panel supported with front and rear pillars can be converted to those of flexible top type by small modifications. For the above reasons, recently, there is the tendency that automobiles of flexible top type increase dramatically.

The automobile of the flexible top type is designed so as to take a closed posture, or to become in a closed state, in which the roof panel opening is closed by fixing a rearward end portion of the flexible top to the rear header while abutting a forward end portion of the top with the front header, on the one hand, and so as to take an open posture, or to become in an open state, in which the roof panel opening is wide open by transferring the forward end portion of the top rearwardly to a large extent from the closed posture toward the rear header. At this open posture, the flexible top is housed or accommodated in a foldable state.

For the automobiles of conventionally flexible top type, however, the flexible top in a housed state is still extended wide in a longitudinal direction so that it covers over a considerably large portion of the roof panel opening, thus impairing a sufficiently open feeling. It is further to be noted that, as the roof panel opening is open while the flexible top is housed, the flexible top is in a state that it projects upwardly to a considerable extent thus resisting air during running so that it increases a resistance to air and it causes running noises derived from wind blowing.

SUMMARY OF THE INVENTION

Therefore, the present invention has the object to provide a flexible top apparatus of a vehicle, as automobile, capable of widely opening an upper portion of its vehicle chamber and housing a flexible top so as to cause no resistance to air during running.

The present invention has another object to provide a flexible top apparatus of a vehicle, in which the flexible top member can be placed and accommodated in a folded state on a trunk lid without interference with the opening of the trunk lid.

In order to achieve the above-described object, the present invention consists of a flexible top apparatus of a vehicle in which:

a roof panel (4) connected to a vehicle body through at least a pair of left-hand and right-hand front pillars and a pair of left-hand and right-hand rear pillars;

said roof panel comprising a front header, a pair of left-hand and right-hand roof side rails and a rear header, which are disposed so as to enclose a roof aperture;

a rear window glass panel being fixed to said pair of left-hand and right-hand rear pillars and said rear header; and a flexible top being foldable or extendable in a longitudinal direction of the vehicle body and having an area as large in size as said roof aperture so as to close said roof aperture when extended in the longitudinal direction thereof;

wherein said flexible top in an extended state is in abutment at its forward end portion with said front header, at its left-hand and right-hand side end portions with said left-hand and right-hand roof side rails, respectively, and at its rearward end portion with said rear header when said roof aperture is closed with said flexible top;

said flexible top apparatus characterized in that said flexible top in a folded state selectively takes either or a first position or a second position, said first position being located in a position over a trunk lid and said second position being located in a position where the flexible top is evacuated from said first position so as to cause no interference with the trunk lid when the trunk lid is opened.

With the arrangement as have been described hereinabove, the present invention prevents the flexible top member from closing a rearward portion of its roof aperture when it is folded and accommodated because it is accommodated in a folded state in a position over the trunk lid, whereby the roof aperture can be open to a full extent. Furthermore, the flexible top in an accommodated state is placed on the trunk lid not on the roof, so that a running resistance and noises caused by wind can be avoided or diminished. Even if the flexible top is accommodated over the trunk lid, it is evacuated to a position that does not interfere with the trunk lid when the trunk lid is opened, so that damages or injuries of the trunk lid and the flexible top can be prevented.

BRIEF DESCRIPTION OF THE DRAWINGS

Other objects, features and advantages of the present invention will become apparent in the course of the description of the preferred embodiments which follows when interpreted in the light of the accompanying drawings.

FIG. 7 is a perspective view showing a position-regulating unit mounted to the flexible top.

FIG. 8 is a side view showing the position-regulating unit in a state that the flexible top is locked.

FIG. 9 is a side view showing the position-regulating unit in a state that the flexible top is unlocked.

FIG. 12(b) is a perspective view taken along line XII—XII of FIG. 12(a).

FIGS. 13 to 15 are side views showing a variation in states of the forward and rearward transfer units.

FIG. 16 is a longitudinal section showing an essential portion of an upper vehicle body with the flexible top.

FIGS. 17 and 18 are views showing a variation in the state of FIG. 16.

FIG. 20 is a perspective view showing a whole outline of a mechanism for swinging the board member between the rearward end roof portion and the trunk lid.

FIG. 21 is a partial sectional view showing the construction of a drive gear unit shown in FIG. 20.

FIG. 29 is an exploded, perspective view showing the upper portion of the body.

DETAILED DESCRIPTION OF THE PREFERRED EMBODIMENTS

Figure 26:
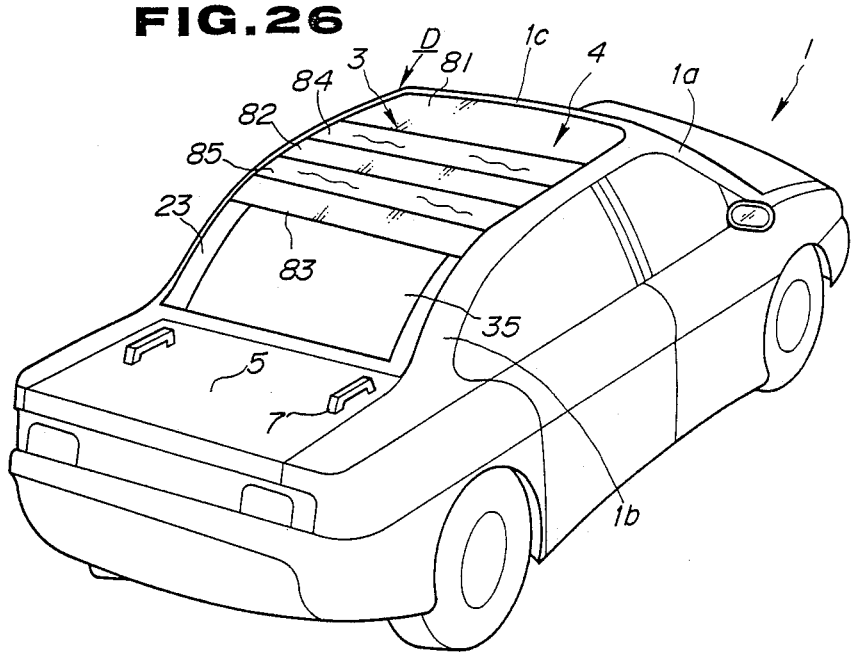
FIG. 26 is a perspective view showing a state in which the roof aperture is closed with the flexible top.
Figure 27:
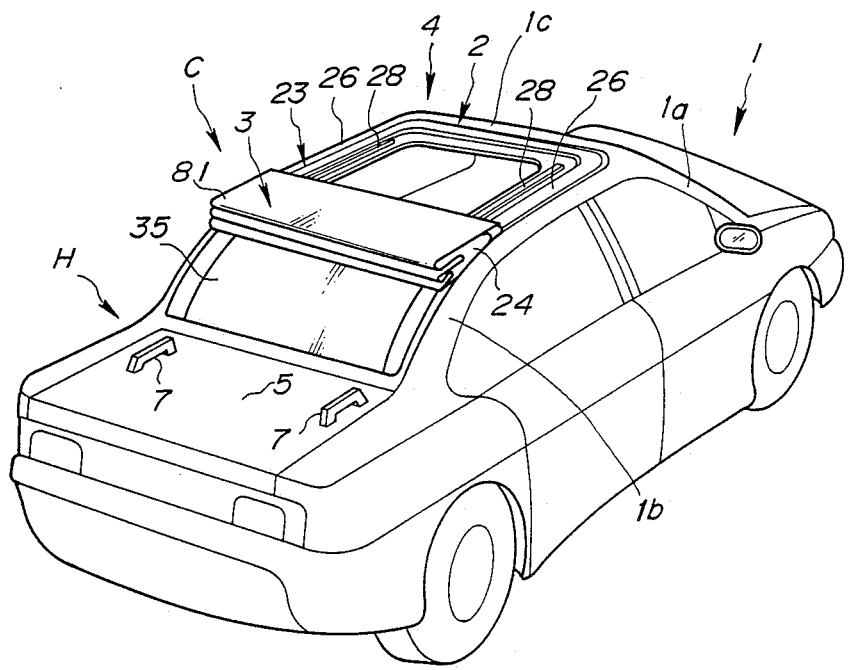
FIG. 27 is a perspective view showing a state in which the flexible top is folded.
Figure 28:
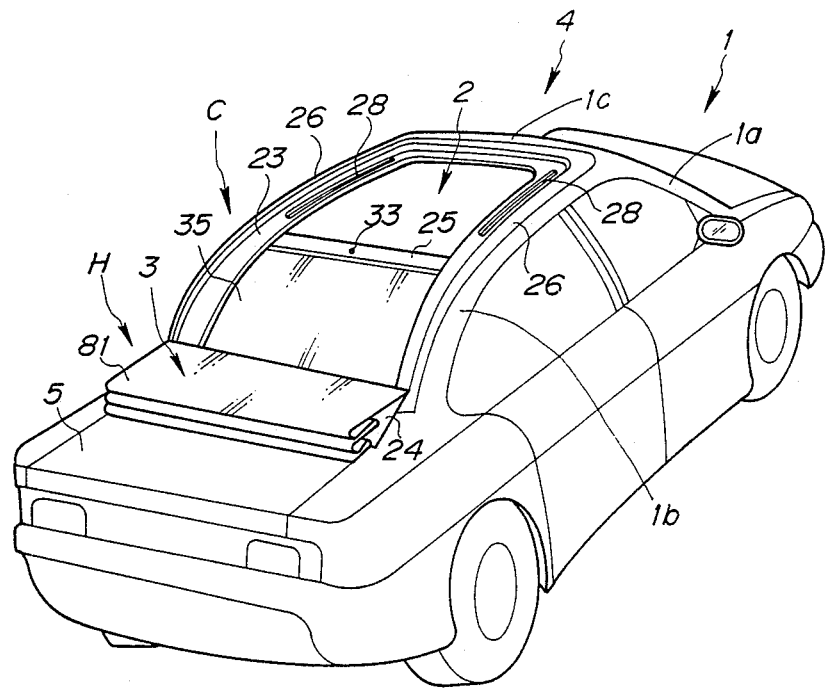
FIG. 28 is a perspective view showing a state in which the flexible top in a folded state is accommodated in a position over the trunk lid.

Referring to FIGS. 26 to 28, it is shown that the vehicle body 1 is provided with a roof aperture 2 on its roof which is connected to the vehicle body 1 through front pillars 1a and rear pillars 1b, and the roof aperture 2 is enclosed with a roof panel 4 comprising a front header 1c, a pair of left-hand and right-hand roof side rail sections (26), and a rear header (25). The roof aperture 2 is covered or uncovered with an extendable or foldable top member 3. The roof aperture 2 is covered with the top member 3 in a closed position D as shown in FIG. 26 and it is uncovered bY sliding backward along first rails 28 disposed on the roof panel 4 and accommodated on a board member 24 disposed on the roof panel 4. The top member 3 is then moved or transferred backward while being folded on the board member 24 and accommodated on a support base 7 disposed on a trunk lid 5 at a position backward of a rear window 35. The top member 3 is then locked on the support base 7 as shown in FIG. 28.

When the trunk lid 5 is unlocked, the top member 3 is evacuated to a position where it does not interfere with the trunk lid 5 and the trunk lid 5 is not brought into abutment with the top member 3 or does not interfere therewith when the trunk lid 5 is opened upward.

A control system for various operations such as opening or closing, accommodating, locking or unlocking the top member 3, etc., will be described more in detail with reference to FIGS. 1 and 2.

Figure 2:
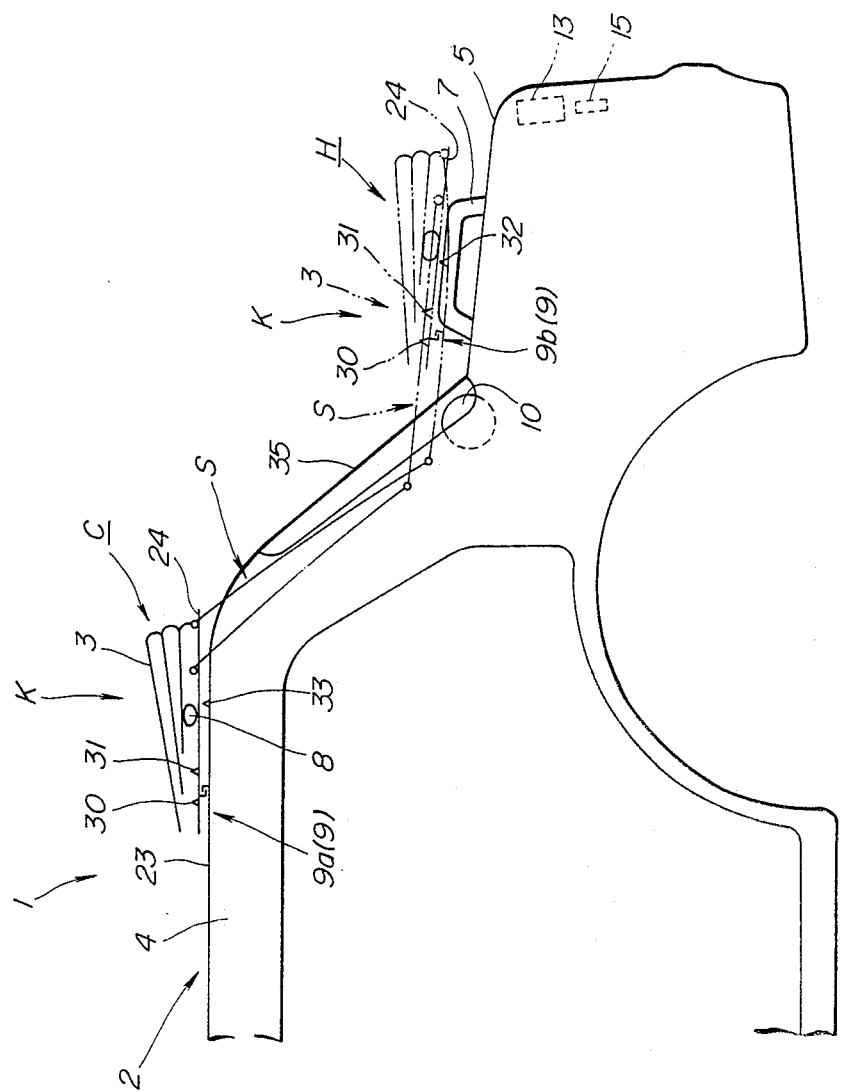
FIG. 2 represents an outline of the flexible top apparatus.

As shown in FIG. 2, the top member 3 is covered or uncovered by the motor unit 8 mounted on the board member 24. The top member 3 is slidably transferred or moved backward on the roof panel 4 up to the board member 24 disposed at an accommodating position C and folded at a position K on the board member 24, thereby opening the roof aperture 2. As the top member 3 is slided backward in a given distance from the position K on the board member 24 by means of the motor unit 8, a first locking mechanism 9a of locking means 9 is unlocked. Thus, the board member 24 is allowed to be transferred or moved to an accommodating position H on the trunk by means of a swinging member S operated by a motor unit 10 mounted on the side of the vehicle body 1 while the top member 3 is folded thereon. The top member 3 placed on the board member 24 is then transferred or moved forward in a given distance from the accommodating position H to a position K by means of the motor unit 8 and the board member 24 is locked on a support base 7 by means of a second locking mechanism 9b. This locked state can be unlocked by sliding the top member 3 backward in the same given distance as above from the accommodating position K by means of the motor unit 8, thereby allowing the board member 24 to be moved forward or return to the accommodating position C on the roof panel 4 and locking the board member 24 by the first locking mechanism 9a. Thus the top member 3 is allowed to close the roof aperture 2.

As a trunk-unlocking detecting means 15 disposed to a trunk locking means 13 is unlocked, a signal detecting this trunk unlocking is sensed and the top member 3 is evacuated from the rearward accommodating position H to the upward accommodating position C by means of the top-evacuating control means 11d while being in a folded state on the board member 24 by rotating the motor unit 10 counterclockwise. This evacuation of the board member 24 on which the top member 3 is being placed prevents the trunk lid 5 from bumping against or coming into contact with the top member 3 and the board member 24 when the trunk lid 5 is opened.

The positions of the top member 3 and the board member 24 are sensed by means of limit switches 30, 31, 32 and 33. The board member 24 is provided with the limit switches 30 and 31. The limit switch 30 is to sense a location of the top member 3 in the position K, and the limit switch 31 is to sense the unlocking of the board member 24 by sliding it backward in the given distance from the position K while the top member 3 is in a folded state on the board member 24. The limit switch 32 is mounted on the support base 7 to sense a location of the board member 24 in the second accommodating position H.

In the rearward accommodating position H, when the top member 3 is returned to the position K from the state in which it has been slided backward in the given distance from the position K on the board member 24, the board member 24 is locked on the support base 7 by the locking means 9b. This state is sensed by the limit switch 30. As the top member 3 has been transferred on the board member 24 backward in the given distance from the distance K, the locking mechanism 9b is unlocked. This state is detected by the limit switch 31. The unlocking of this second locking mechanism 9b allows the board member 24 to be ready to be transferred to the accommodating position C, namely, to the rearward portion of the roof panel 4, or the roof.

The base frame 23 of the vehicle body 1 is provided with the limit switch 33 which senses the location of the board member 24 when it is transferred from the second accommodating position H to the first accommodating position C.

Figure 1:
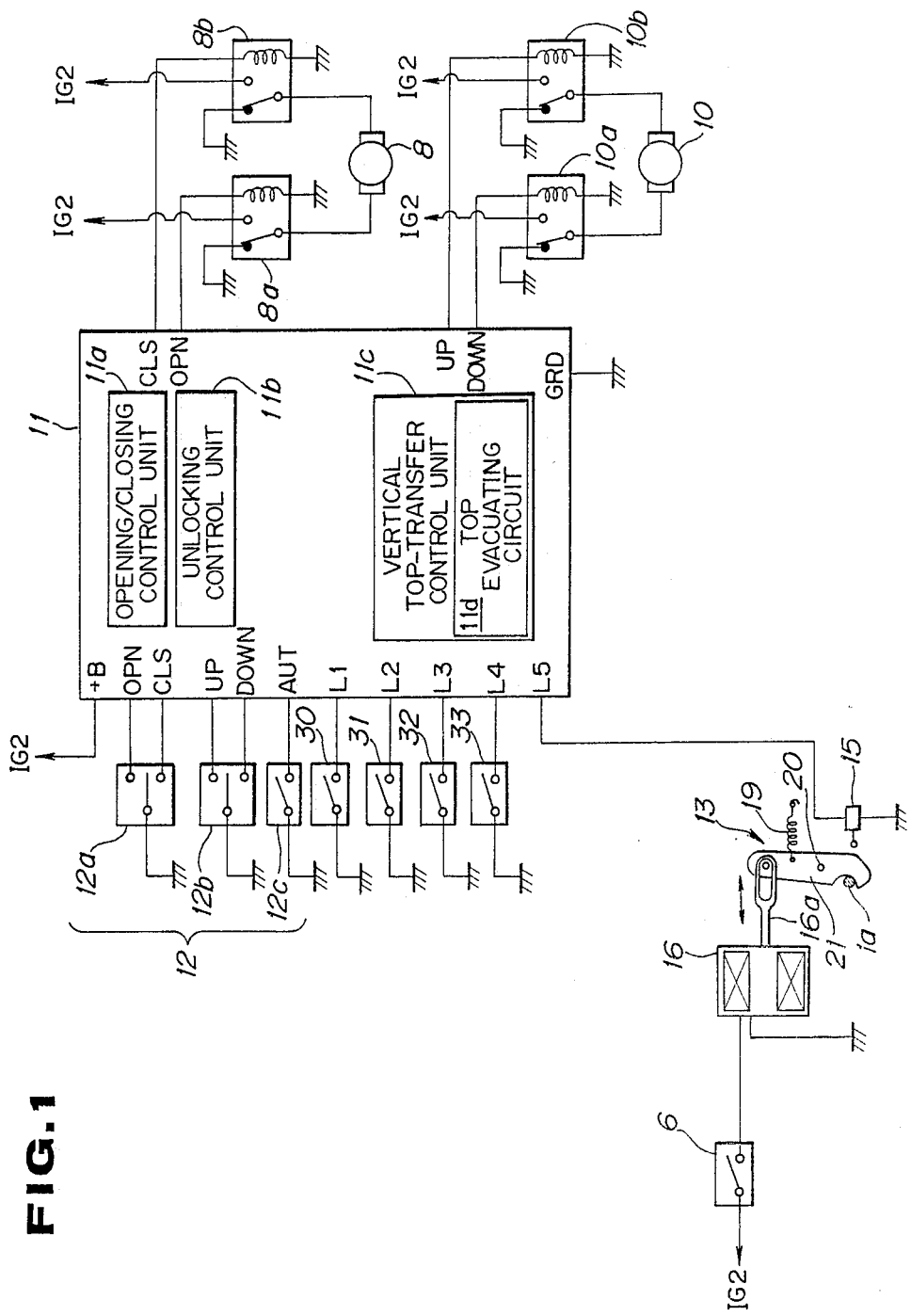
FIG. 1 represents a control system of the flexible top apparatus according to one example of the present invention.

As shown in FIG. 1, an instrument panel (not shown) is provided with a trunk opener switch 6 to be selectively operated by the driver, and main switches 12a, 12b, and 12c for operating the opening, closing or vertical transferring the top member 3. The main switch 12a has the OPN joint for implementing the opening operation of an top member 3 and a CLS joint for implementing the closing operation of the top member 3. The main switch 12b has a DOWN joint for transferring the top member 3 from the first accommodating position C to the second accommodating position H and an UP joint for transferring it to the second position H to the first position C. The main switch 12c is provided with an AUT joint for accommodating the top member 3 from the closed state and continuously transferring it to the second, backward accommodating position H.

As shown in FIG. 1, a control unit 11 comprises a microcomputer which is arranged so as to control an overall operation of a flexible top system by driving the motor units 8 and 10 in a controlled manner in accordance with a pre-memorized program upon an instruction from the driver. To the input side of the control unit 11 are connected an ignition contact IG2 for receiving a supply of electricity from an electric source, a trunk-unlocking limit switch 15 as a trunk-unlocking detecting means, main switches 12a, 12b and 12c, and limit switches 30, 31, 32 and 33. To the output side of the control unit 11 are connected the motor unit 8 through relays 8a and 8b and the motor unit 10 through relays 10a and 10b, respectively, for a supply of electricity from the ignition contacts IG2. The control unit 11 comprises an opening-closing control unit 11a, an unlocking control unit 11b, and a vertical top-transfer control unit 11c.

The opening-closing control unit 11a generates an operating signal to the motor unit 8 in response to a signal from the main switch 12a for an instruction to open, or uncover, or close, or cover, the roof aperture with the flexible, foldable top member 3, thereby controlling the roof aperture portion 2 to be opened or closed by folding or expanding the top member 3.

The unlocking control unit 11b generates an operating signal to the motor unit 8 in response to a signal from the main switch 12b for unlocking the board member 24 disposed in a locked state by sliding the board member 24 backward in a given distance from the roof position K in such a manner as have been described hereinabove.

The vertical top-transfer control unit 11c is designed to generate an operating signal to the motor unit 10 in response to a signal for having unlocked the board member 24, thereby permitting a vertical transfer, i.e., a transfer between the roof and the trunk lid, of the top member 3 placed or accommodated on the board member 24 from the position C, at which the board member 24 is accommodated on the roof, to the position H, at which it is accommodated on the trunk lid, or from the position H to the position C. The vertical top-transfer control unit 11c is provided with a top-evacuating circuit 11d. The top-evacuating circuit 11d is devised so as to allow the board member 24 with the top member 3 placed thereon to be evacuated up to the accommodating position C at which the top member 3 does not interfere with or block the trunk lid 5 when opened. This evacuation is made on condition that the trunk-unlocking limit switch 15 is turned on and the trunk locking means 13 is unlocked.

Figure 6:
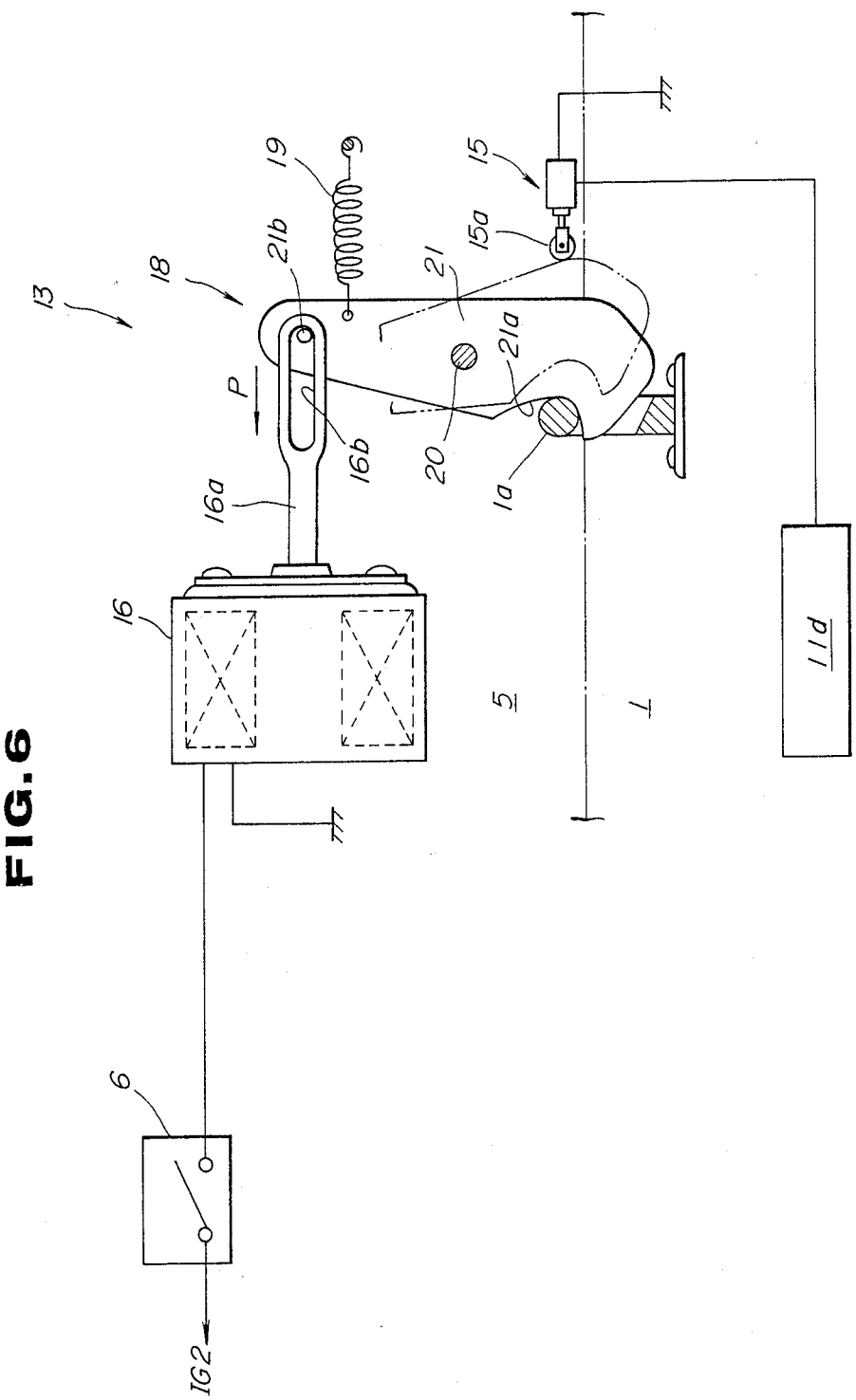
FIG. 6 represents a construction of trunk locking means for locking the trunk lid in a closed state.

The trunk locking means 13 comprises a solenoid 16 and a trunk locking mechanism 18, the solenoid being excited when a trunk opening switch 6 is turned on, as shown in FIG. 6. The trunk locking means 13 is operated so as to be locked when the trunk lid 5 is closed and to be unlocked when the trunk opening switch 6 is turned on or when a key of the trunk is opened.

As shown specifically in FIG. 6, the trunk locking mechanism 18 comprises roughly a lock lever 21 disposed on the trunk lid 5, and an engaging rod 1a. The lock lever 21 is urged in a clockwise direction in the drawing by a spring 19 disposed under tension to the trunk lid 5 so as to be pivotable about a support shaft 20. The lock lever 21 is formed with a concave portion 21a opening toward the engaging rod 1a, and an engagement of the concave portion 21a with th engaging rod 1a locks the trunk lid 5, thereby prohibiting the opening of the trunk lid 5.

As the lock lever 21 is pivoted in a counterclockwise direction in the drawing, the concave portion 21a is to be released from the engaging rod 1a to thereby unlock the trunk lid 5. More specifically, the unlocking is implemented by freely engaging a projection 21b disposed on an upper portion of the lock lever 21 with a long hole 16b of a plunger 16a mounted to the solenoid 16 and exciting the solenoid 16 with the trunk opening switch 6 turned on, thereby moving the plunger 16a toward the arrow P as indicated in the drawing and forcing the lock lever 21 to pivot in the counterclockwise direction about the shaft 20. Although not shown in the drawing, the unlocking may be also implemented by inserting a key into a trunk key cylinder disposed perpendicularly toward the face of this drawing and opening the lock directly by pivoting the lock lever 21 counterclockwise to unlock the trunk lid 5.

The trunk-unlocking limit switch 15 is disposed at a position rearward of the lock lever 21 so as to allow its contactor 15a to be abutted with the lock lever 21 when the trunk lid 5 is unlocked, as indicated by the two-dot-and-dash line in the drawing, thereby detecting that the trunk locking means 13 is unlocked. The detected signal from the trunk-unlocking limit switch 15 is fed to the top-evacuating circuit 11d (FIG. 1) and, when the trunk locking means 13 is unlocked, the top-evacuating circuit 11d is operated in the manner as have been described hereinabove.

Figure 3:
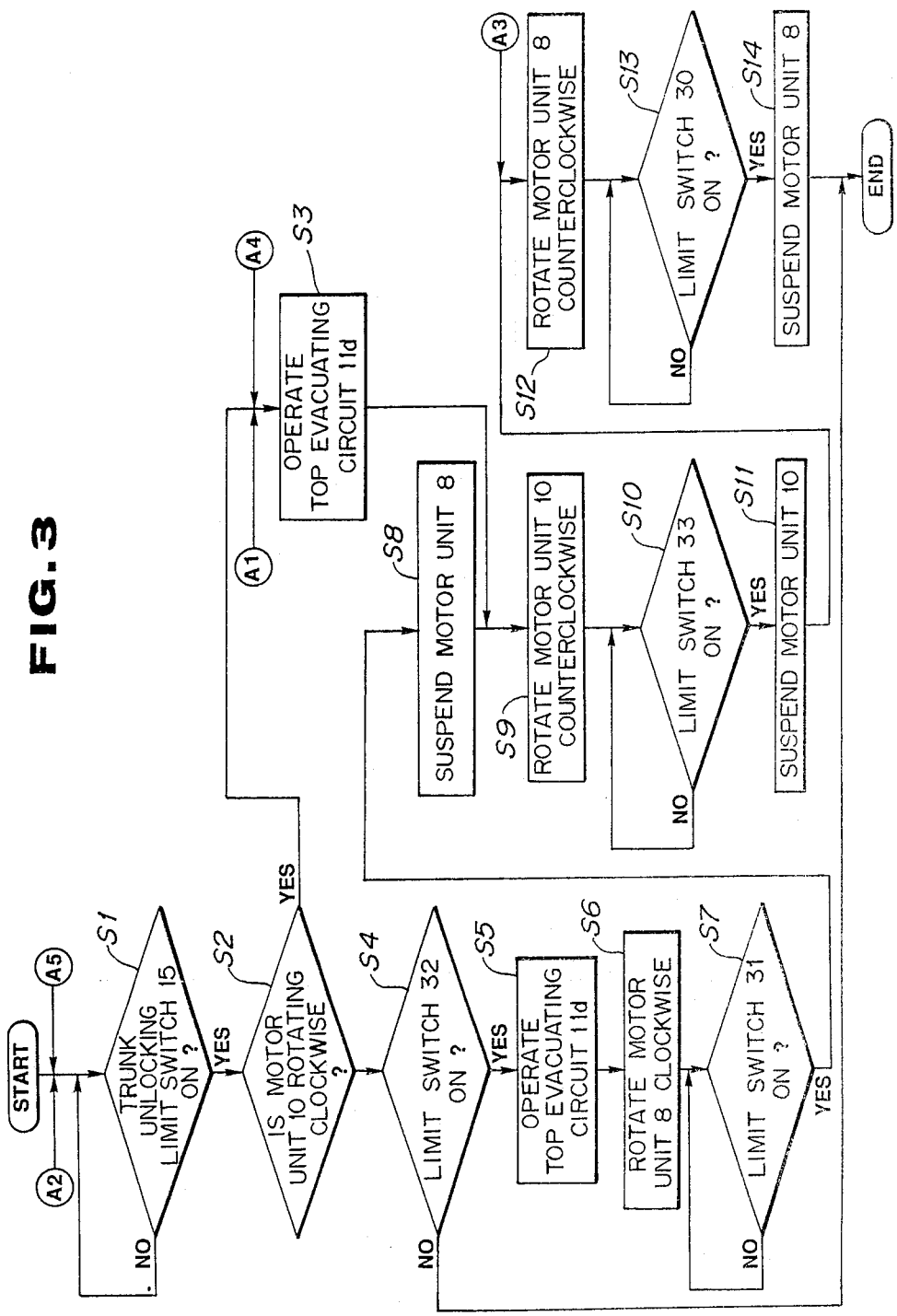
FIG. 3 is a flow chart showing an example of control over evacuation of the flexible top from the trunk lid.

An example of control by means of the top-evacuating circuit 11d will be described with reference to the flow chart as shown in FIG. 3.

First at step S1, after the flow has been started, it is judged whether or not the trunk-unlocking limit switch 15 is turned on and the trunk lid 5 is unlocked. If YES, the flow goes to step S2 and it is judged there whether or not the motor unit 10 is rotating in the clockwise direction. If it is judged that the clockwise rotation of the motor unit 10 is executed and the top member 3 is moving downward, then the top-evacuating circuit 11d is operated at step S3, thereby permitting the motor unit 10 to start being rotated counterclockwise at step S9. This counterclockwise rotation of the motor unit 10 permits an upward evacuation of the top member 3 toward the accommodating position C. Then at step S10, it is detected by the limit switch 33 that the top member 3 is evacuated on the accommodating position C on the roof 4 and, at step S11, the motor unit 10 is suspended.

Then the flow proceeds to step S12, and the motor unit 8 is rotated counterclockwise, thereby allowing the top member 3 placed on the board member 24 to move in a forward direction in a given distance. As it is detected that the top member 3 has been advanced in the given distance, the flow proceeds to step S13 where it is judged there whether the limit switch 30 is operated or not. If the limit switch 30 is turned on, then at step S14, the motor unit 8 is suspended. This operation allows the top member 3 to be accommodated in a folded state on the board member 14 and locked at the position C.

Turning back to step S2, when it is judged there that the motor unit 10 is rotating counterclockwise, then it is judged at step S4 whether or not the limit switch 32 is turned on. When it is judged that the limit switch 32 is turned on, namely, when the top member 3 is accommodated at the position H located on the trunk lid 5, the top-evacuating circuit 11d starts operating at step S5. Then at step S6, the motor unit 8 is rotated clockwise to slide the top member 3 on the board member 24 backward from the position K until the limit switch 31 tuns on. At step S7, the limit switch 31 turns on, then the flow proceeds to step S8 where the motor unit 8 is suspended. Thereafter a series of the operation from step S9 to step S14 is repeated to allow the top member 3 to transfer upward to the accommodating position C on the roof and to be locked there.

When it is judged at step S4 that the limit switch 32 is not turned on, the flow ends. Furthermore, at step S1, when it is judged that the limit switch 15 is not turned on, then the flow is returned.

Figure 4:
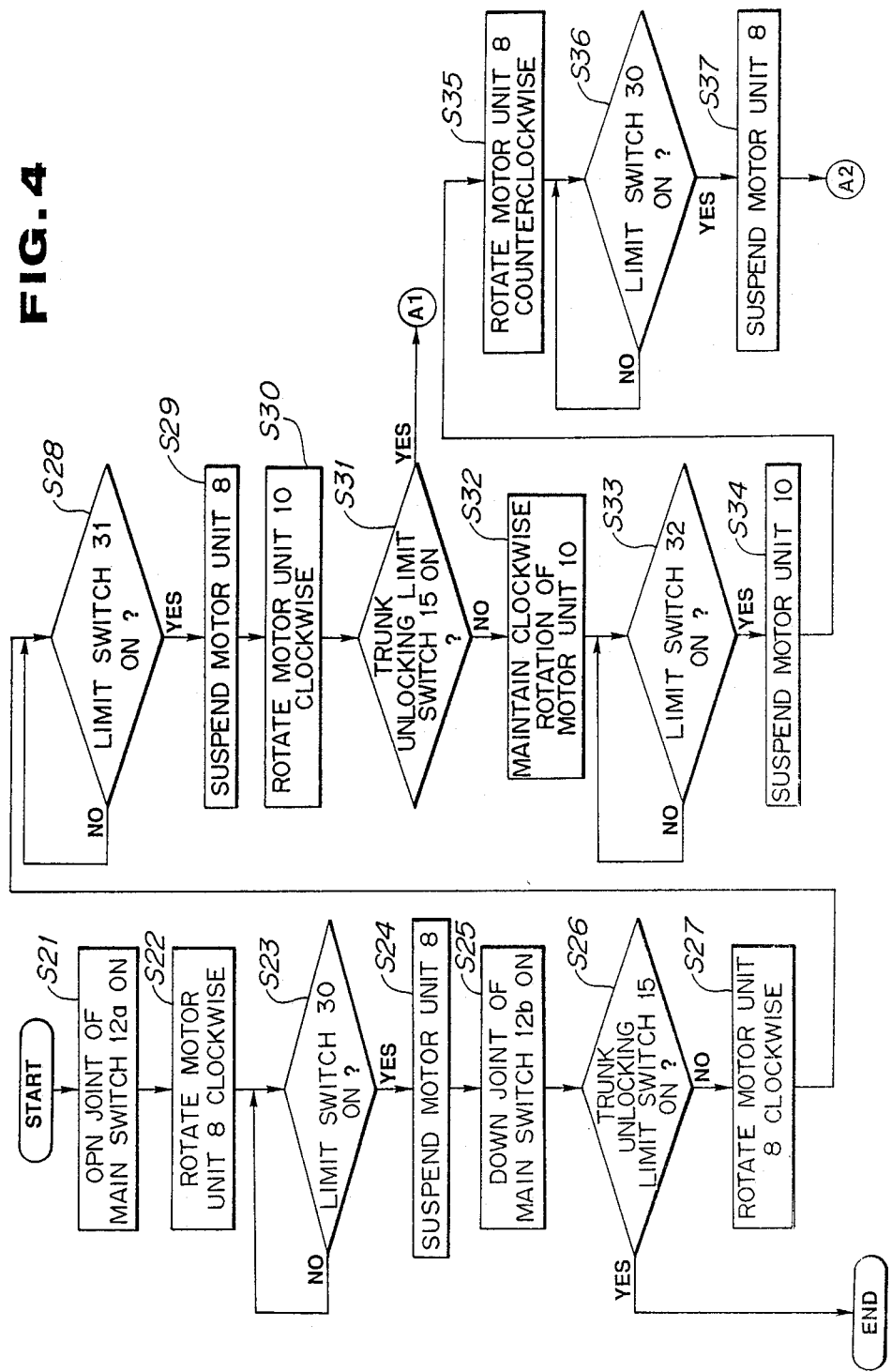
FIG. 4 is a flow chart showing an example of control over accommodation of the flexible top in a folded state.
Figure 5:
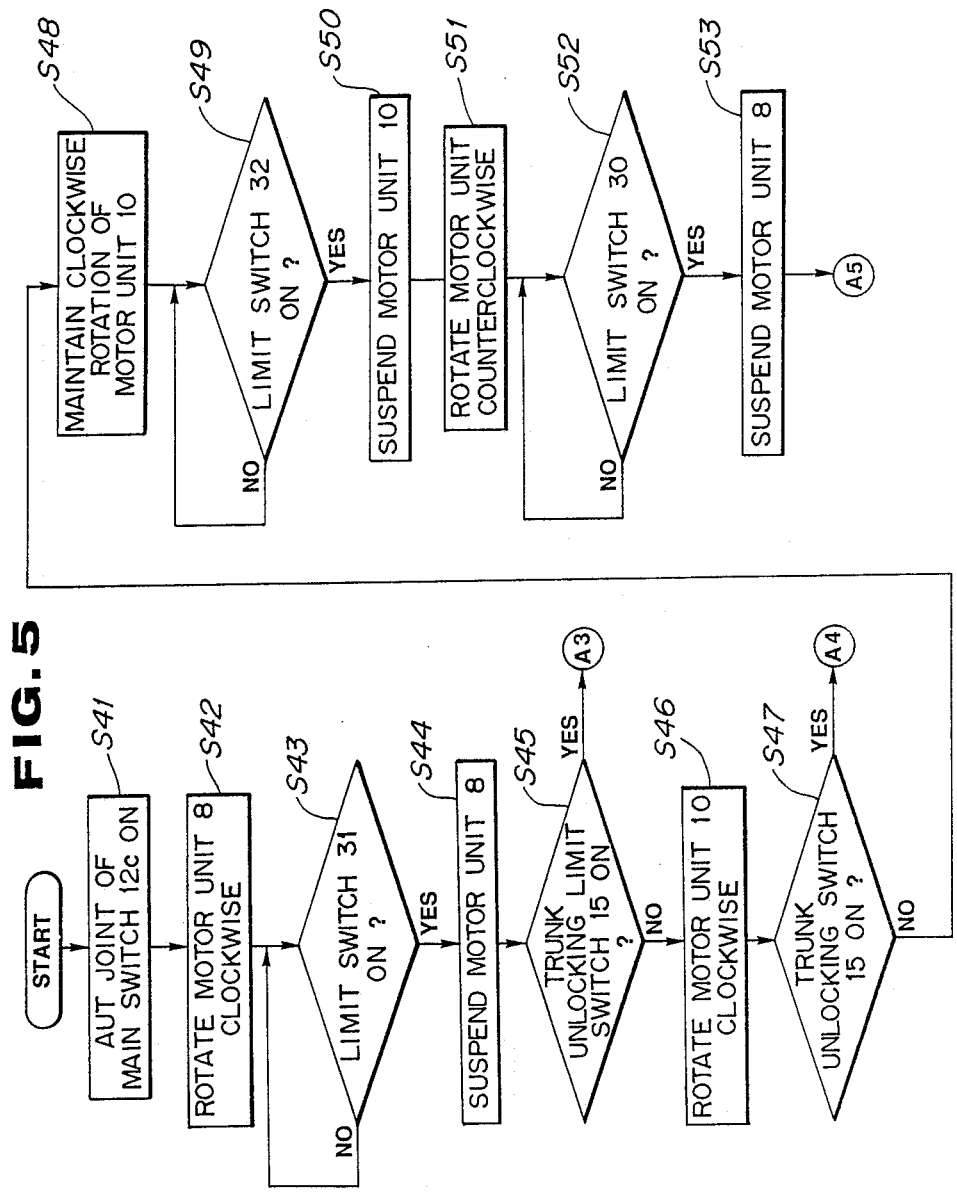
FIG. 5 is a flow chart showing an example of control over closing the roof aperture with the flexible top.

The following is a description on an example of a content of a basic control over a canvas top control system in which such a top-evacuating system as have been described hereinabove is incorporated, with reference to the flow charts as shown in FIGS. 4 and 5.

(1) Uncovering the top member 3 in a closed state and accommodating it:

As shown in FIG. 4, at step S21, the OPN joint of the main switch 12a is brought into contact, thereby allowing the opening-closing control unit 11a to generate a signal for rotating the motor unit 8 clockwise and, at step S22, the motor unit 8 is rotated clockwise to slide the top member 3 in the backward direction until the limit switch 30 is turned on at step S23. Then at step S24, the motor unit 8 is suspended and the top member 3 is folded at the position K on the board member 24 disposed at the accommodating position C and uncovering the roof aperture 2 with the top member 3.

Then the flow proceeds to step S25 and the DOWN joint of the main switch 12b is turned on. Thereafter, at step S26, it is judged whether or not the trunk-unlocking limit switch 15 is turned on. As it is judged there that the limit switch 15 is turned off, a signal for rotating the motor unit 8 clockwise is generated from the unlocking control unit 11b and the motor unit 8 is rotated in the clockwise direction at step S27, thereby allowing the top member 3 to be moved or slided further backward in a given distance up to the position at which the limit switch 31 is turned on. As the limit switch 31 is turned on at step S28, then the top member 3 is suspended at step S29 and the board member 24 is unlocked by means of the locking mechanism 9a. Thereafter, a signal for rotating the motor unit 10 clockwise is generated from the vertical top-transfer control unit 11c and the motor unit 10 is rotated in the clockwise direction to swing the board member 24 downward with the top member 3 accommodated thereon in a folded state by means of a swinging mechanism S at step S30. When it is judged at step S31 that the trunk-unlocking limit switch 15 is not yet turned on, the clockwise rotation of the motor unit 10 is maintained at step S32 and the motor unit 10 is suspended at step S34 as the board member 24 is transferred and placed on the support base 7 of the trunk lid 5 and the limit switch 32 is turned on at step S33. Then, the unlocking control unit 11b generates a signal for a reverse rotation to the motor unit 8, and the motor unit 8 is rotated counterclockwise at step S35. This reverse rotation of the motor unit 8 allows the top member 3 to advance up to the releasing position K on the board member 24 at which the board ember 24 is released. As the limit switch 30 is turned on at step S36, the motor unit 8 is suspended at step S37 as the board member 24 has been accommodated and locked on the support base 7 by means of the locking mechanism 9b. Then the flow proceeds to step S1 of FIG. 3.

Turning back to step S26, when it is judged that the trunk-unlocking limit switch 15 is turned on, the top member 3 is not transferred to the accommodating position H, and the flow ends. Further, as it is judged at step S31 that the trunk-unlocking limit switch 15 is turned on, the flow goes to step S3 of FIG. 3 and the corresponding operation is repeated.

(2) Continuous operation of opening top member 3 in a closed state and accommodating it:

Referring to FIG. 5, when the AUT joint of the main switch 12c is contacted at step S41, the motor unit 8 starts rotating in the clockwise direction at step S42, thereby transferring the top member 3 in a full closed state in the backward direction from the position K to uncover the roof aperture and folding it onto the board member 24 disposed on the accommodating position C on the roof. The folding is continued until the limit switch 31 is turned on at step S43, whereby the top member 3 is folded on the board member 24 and accommodated thereon. The motor unit 8 is then suspended at step S44 as the limit switch 31 is turned on. In this state, the locking of the board member 24 by means of the locking mechanism 9a is released. Immediately thereafter it has been judged that the limit switch 31 was turned on, it is further judged at step S45 whether the trunk-unlocking limit switch 15 is turned on or not. If it is judged there that the limit switch 15 is turned off, the motor unit 10 starts rotating clockwise at step S46, thereby allowing the board member 24 with the top member 3 folded and accommodated thereon to be transferred downward. During this step, a judgment on the state of the trunk-unlocking limit switch 15 has been continued and the clockwise rotation of the motor unit 10 has also been maintained at step S48 until the limit switch 15 is turned on at step S49. When it has been confirmed by the limit switch 32 at step S49 that the board member 24 was transferred to the support base 7, the motor unit 10 is suspended at step S50 and then the motor unit 8 starts rotating counterclockwise at step S51, thereby allowing the top member 3 to advance to the position K while it has been placed on the board member 24. As the top member 3 is allowed to advance up to the position at which the limit switch 30 is turned on, it is then judged at step S52 that the limit switch 30 is turned on or not, then the flow proceeds to step S53 where the motor unit 8 is suspended to have the top member 3 on the board member 24 accommodated and locked on the support base 7. Then the flow proceeds to step 1 of FIG. 3.

At step S45, when it is judged that the trunk-unlocking limit switch 15 is turned on, in other words, that the trunk lid 5 can be opened, the flow proceeds to step S12 of FIG. 3 and the top member 3 is locked at the accommodating position C on the roof 4 together with the board member 24. Further, when it is judged at step S47 that the trunk-unlocking limit switch 15 is turned on, the flow advances to step S3 of FIG. 3 to evacuate the top member 3 together with the board member 24 by transferring it upward to the accommodating position C in order to avoid an interference or contact with the trunk lid 5 when it is opened.

While the AUT joint of the main switch 12c is on, either of the CLS joint of the main switch 12a or the UP joint of the main switch 12b is turned on, whereby the motor unit 8 or the motor unit 10 starts rotating in the reverse direction so as to close the top member 3 or to transfer it upward.

It is provided herein that, in order to have the trunk lid 5 opened directly by means of the key or to have the top-evacuating system operated, a circuit may be arranged so as to connect the control unit 11 as well as the motor unit 8 and 10 directly to an electric source consisting of a battery, when the trunk-unlocking limit switch 15 is turned on. As have been described hereinabove, when the top-evacuating system is incorporated into the flexible top control system and the trunk locking means 13 is unlocked, the top member 3 is transferred to the position C where it does not interfere or contact with the trunk lid 5 when the lid 5 has been opened so that the trunk lid 5 can be opened without any interference or abutment with the top member 3. This arrangement improves safety in handling the trunk lid 3 and prevents damages and injuries of the top member 3 and the trunk lid 5 as well.

The following is a description on a preferred aspect of the structure and mechanical construction of the flexible top system according to the present invention for practicing the the control as have been described hereinabove.

As shown in FIG. 29, the canvas top vehicle is provided on its roof 4 with an aperture 22 extending longitudinally. To the aperture 22 is mounted a canvas top assembly Z which comprises a base frame 23, the board member 24 to be slidably mounted on the base frame 23, and the top member 3.

Referring to FIGS. 27 to 29, the base frame 23 comprises a rear header portion 25 and a pair of side rail portions 26. The rear header portion 25 is provided on its upper face with the limit switch 33 facing upward, thereby permitting its contactor to abut with a rearward back face of the board member 24 when the board member 24 is transferred to the accommodating position C and as a consequence generating a signal for indicating the state in which the board member 24 has reached the position C (see FIGS. 17 and 22). On each of the side rail portions 26 is mounted a first rail section 28 for guiding the top member 3. As shown specifically in FIG. 29, the base frame 23 of the canvas top assembly Z is attached and bolted through a bracket to a periphery of the aperture 22 of the vehicle body 1 and all the periphery of the aperture 22 is sealed between the aperture 22 and the base frame 23.

Figure 18:
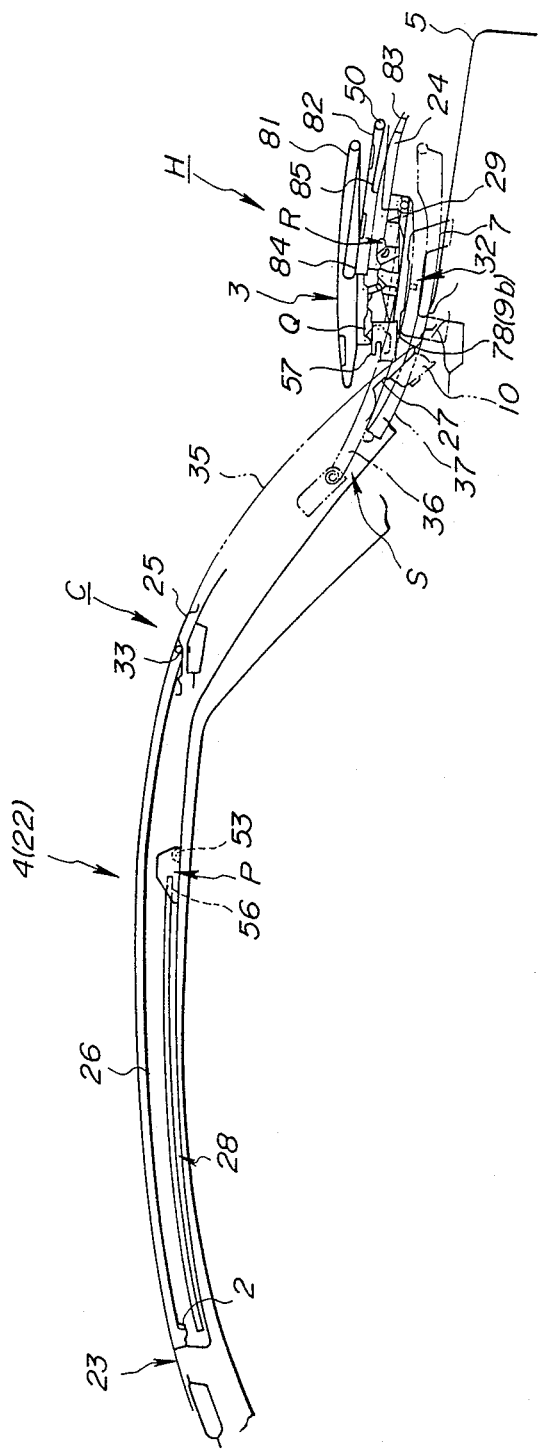
Figure 30:
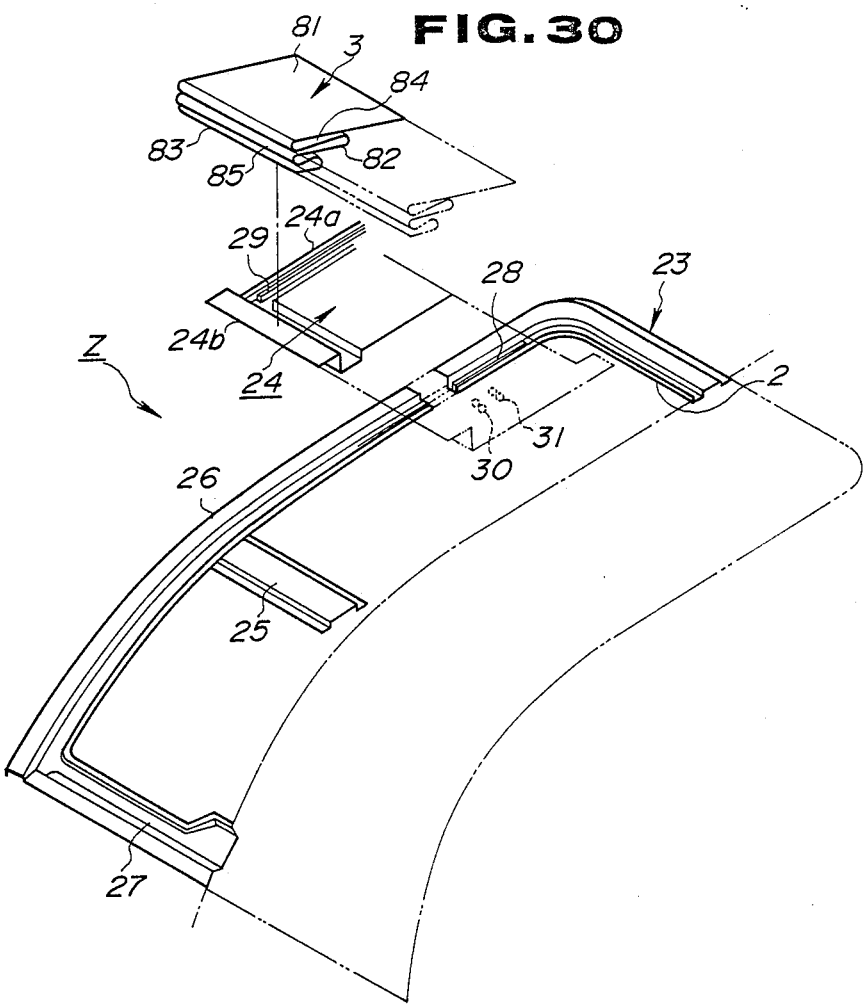
FIG. 30 is an exploded, perspective view showing a flexible top assembly of FIG. 29.

As shown in FIG. 30, the board member 24 is in the form of an approximately flat plate so as to allow the top member 3 to be folded thereon. The top member 3 in such a state as being folded on the board member 24 can be transferred between the accommodating position C located at the rearward end portion of the aperture 22 and the position H located on the trunk lid 5, as shown in FIGS. 17 and 18. On both sides of the board member 24 are mounted second rail sections 29 each of which has substantially the same shape in cross section as the first rail sections 28 mounted on the side rail portions 26 of the base frame 23. Furthermore, a spaced distance between the second rail sections 29 and 29 is the same as that between the first rail sections 28 and 28.

Figure 12A:
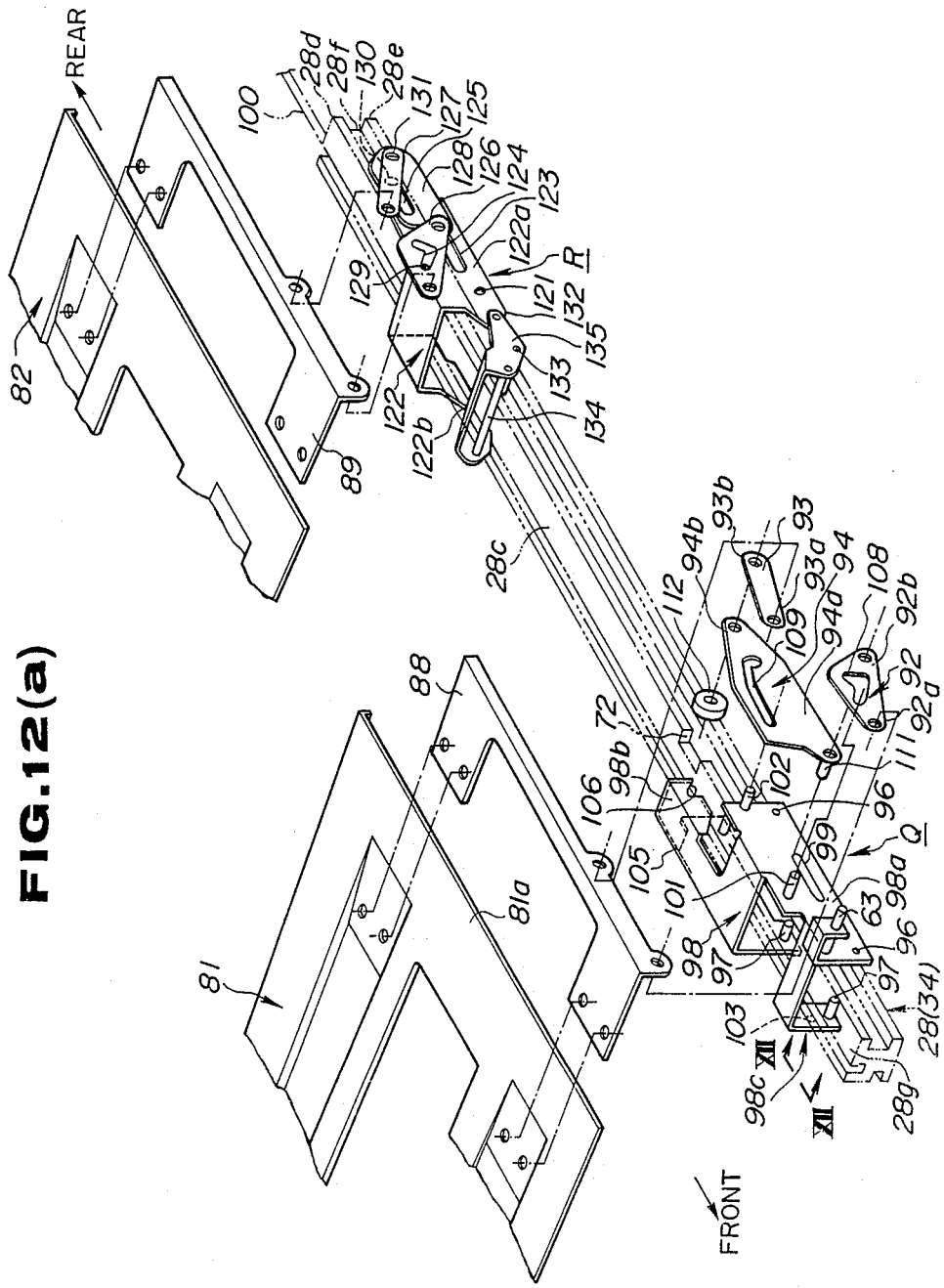
FIG. 12(a) is an exploded, perspective view showing forward and rearward transfer units.
Figure 22:
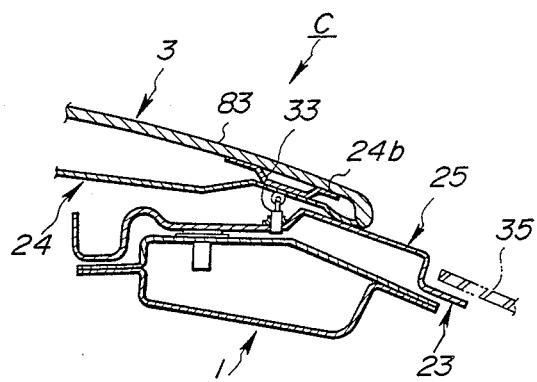
FIG. 22 is a cross-sectional view taken along the line XXII—XXII of FIG. 19.
Figure 25:
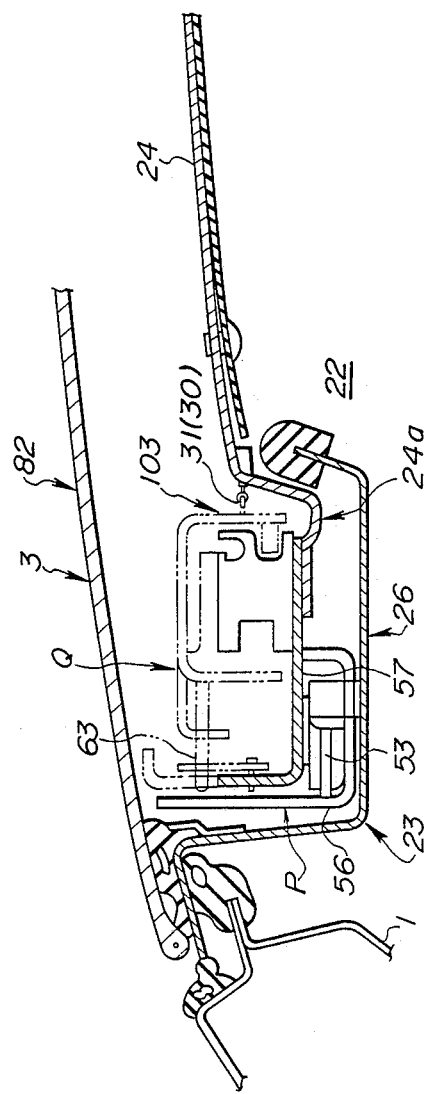
FIG. 25 is a cross-sectional view taken along the line XXV—XXV of FIG. 19.

Referring now to FIG. 7, the board member 24 is provided on its both side portions 24a with a step portion on a side portion of which are mounted the limit switches 30 and 31 in a spaced relationship so as to face the side of the second rail section 29 in a manner as shown in FIG. 25. The limit switches 30 and 31 are arranged so as to abut with a projection 103 disposed on the inner side of a sliding body 98 of a forward transfer unit Q as will be described in more detail hereinafter, as shown in FIGS. 12(a) and 12(b), thereby permitting a detection of respective states in which the top member 3 is transferred to and located in a locked state at the position K and in which it is further transferred backward in the given distance from the position K and unlocked from the locked state. As shown in FIG. 22, to a rearward end portion 24 of the board member 24 is secured a third panel 83 of the top member 3 as will be described hereinafter. Furthermore, as will be described in more detail hereinafter, to each of the both side portions of the board member 24 is connected the swinging mechanism S as shown in FIGS. 16 to 19.

Figure 19:
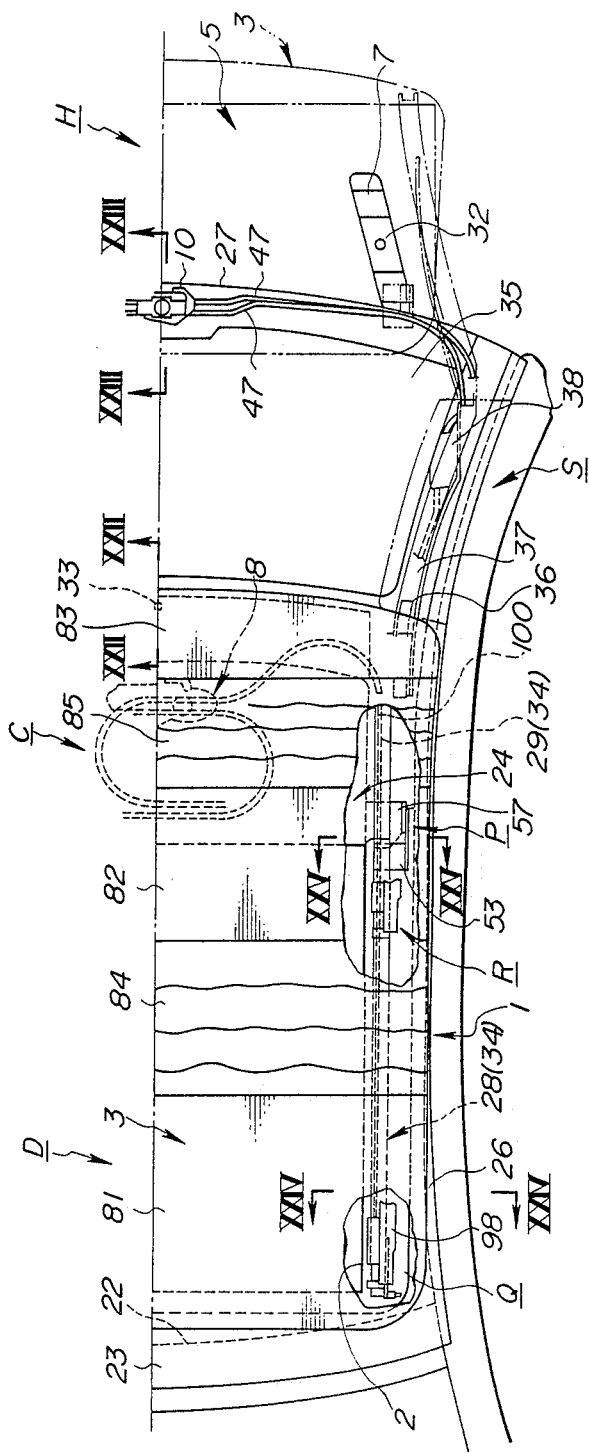
FIG. 19 is a perspective view taken along line XIX—XIX of FIG. 16.
Figure 23:
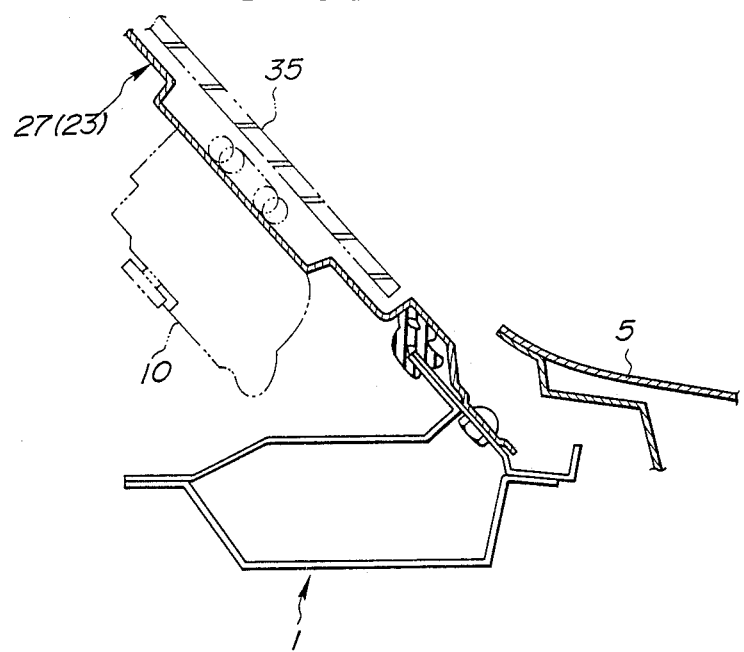
FIG. 23 is a cross-sectional view taken along the line XXIII—XXIII of FIG. 19.

As shown in FIGS. 20 and 21, the swinging mechanism S comprises a pair of main links 36 disposed at its forward position and a pair of sub links 37 disposed at its rearward position. The swinging mechanism S is driven by the motor unit 10 which is disposed at a rear deck portion 27 of the base frame 23 as shown in FIGS. 19 and 23. As shown specifically in FIG. 20, a base end portion 36a of the main link 36 is secured to an output shaft 39 of a drive gear unit 38 and a top end portion 36b thereof is mounted to the board member 24. A base end portion 37a of the sub-link 37 is secured to a base 48 and a top end portion 37b thereof to the board member 24. The drive gear unit 38 comprises six decelerating gears 40 to 45 and a cable-driving gear 46, thereby permitting a conversion of a displacement force of the cable 47 to be pushed or pulled by means of the motor unit 10 into a rotary force of the output force 39 of the drive gear unit 38 (FIG. 21) and a transmission of the rotary force to the main link 36.

This arrangement allows the main link 36 to be swung in the longitudinal direction by pushing or pulling the cable 47 by means of the motor unit 10. The swinging of the main link 36 permits the board member 24 to be transferred between the accommodating position C located at the rearward end portion of the roof aperture 2 as shown in FIGS. 2 and 17 and the position H located on the trunk lid 5 as shown in FIGS. 2 and 18. As shown in FIG. 18, when it is transferred to the second accommodating position H, the board member 24 is placed on the support base 7 disposed on the trunk lid 5 and locked by means of locking means 9b as will be described hereinafter.

As shown in FIG. 8, when the board member 24 is located at the accommodating position C disposed at the rearward portion of the roof aperture 2, the second rail section 29 mounted on the upper face of the board member 24 is arranged so as to be continuous in a straight line with the first rail section 28 mounted on the side rail portion 26 of the base frame 23, whereby the first and second rail sections 28 and 29 constitute a series of a guide rail 34 extending over between the forward end portion and the rearward end portion of the roof aperture 2. At a mating portion between the first and second rail sections 28 and 29 is mounted a position regulating unit P in order to agree the mating portions thereof with each other and to ensure a series of operations including opening, closing and accommodating with ease.

As shown specifically in FIGS. 8 and 9, the position regulating unit P comprises an engaging mechanism 51 and the locking mechanism 9a. The engaging mechanism 51 can accurately align the first rail section 28 with the second rail section 29 when the board member 24 is transferred through the swinging mechanism S by means of the motor unit 10 from the second accommodating position H to the first accommodating position C in the manner as have been described hereinabove. The locking mechanism 9a is to position the board member 24 in transverse, longitudinal and vertical directions.

As shown in FIGS. 7, 8 and 9, the engaging mechanism 51 comprises a concave portion 75 in a conical form disposed inward on a rearward end face 28b of the first rail section 28 and a convex portion 76 in a conical form disposed outward on a forward end face 29b of the second rail section 29 corresponding to the first rail section 28 so as to be tightly engaged with the concave portion 75. As shown specifically in FIG. 8, as the board member 24 is transferred from the second accommodating position H to the first accommodating position C, the concave portion 75 of the first rail section 28 is engaged with the conical projection 76 of the second rail section 29 so as to permit an accurate alignment between the first and second rail sections 28 and 29. When the engaging mechanism 51 is then swung by means of the swinging mechanism S in the backward direction as indicated by the arrow m in FIG. 9 to transfer the board member 24 to the second accommodating position H as will be described hereinafter, the conical concave portion 75 is disengaged from the conical convex portion 76. In this embodiment, as shown in FIG. 7, in order to implement a preliminary positioning of the rail sections in the transverse direction, an engaging piece 71 is provided on a forward end portion of a lock bracket 57, thereby abutting the engaging piece 71 with an inner face of a striker bracket 56 when the second rail section 29 has corresponded to the first rail section 28, as shown in FIGS. 8 and 9).

The locking mechanism 9a is to position the second rail section 29 in its longitudinal and vertical directions with respect to the first rail section 28 and lock the abutment of the former with the latter, in association with the engaging mechanism 51, as shown in FIG. 8, when the board member 24 has been transferred to the second accommodating position H to the first accommodating position C as shown in FIG. 7. Referring again to FIG. 7, the engaging mechanism 9a comprises a striker 53 disposed on the side of the first rail section 28 as well as a first lever 54 and a second lever 55, each disposed on the side of the second rail section 29. The striker 53 is mounted at a rearward end portion 28a of the first rail section 28 through the striker bracket 56 in such a manner that it projects inwardly in the transverse direction of the first rail section 28 and that it is located outside the second rail section 29 and in the position as high as the lower face of the second rail section 29 when the first rail section 28 is connected to the second rail section 29.

The first lever 54 and the second lever 55 are mounted through the second lock bracket 57 to the forward end portion 29a of the second rail portion 29 disposed in a spaced relationship with each other, and they are swingably supported by a first pin 58 and a second pin 59, respectively. The first lever 54 is provided with a first convex portion 60, a second convex portion 62, and a third convex portion 64, the first convex portion 60 being engageable with the striker 55, the second convex portion 62 being for regulating a pivotal movement of the first convex portion 60 in the direction as indicated by the arrow b in which the first convex portion 62 is disengaged, upon engagement with the first convex portion 61 of the second lever 55, and the third convex portion 64 being for pivoting the first lever 54 in engagement with an engaging pin 63 in the direction as indicated by the arrow the engaging pin 63 being disposed in the forward transfer unit Q for locking operation, as will be described hereinafter. The first lever 54 is urged by a spring 67 suspended from the lock bracket 57 so as to be pivotable in the direction as indicated by the arrow b.

The second lever 55 is provided with the first convex portion 61, which is engageable with the second convex portion 62 of the first lever 54, and with a second convex portion 66 which is engaged with the engaging pin for locking operation. The second lever 55 is urged by means of a spring 77 suspended from the lock bracket 57 so as to be pivotable in the direction as indicated by the arrow c. The lock bracket 57 is formed in a dimensional shape so as to be inserted into the inside of the striker bracket 56 and it is provided with a guiding groove 68 extending in the longitudinal direction, into which the engaging pin 63 for locking operation can be slidably engaged.

As shown further in FIG. 8, the first lever 54 is such that a top portion of its third convex portion 64 is located approximately at a lower face of the guiding groove 68 in the position in which the first convex portion 60 is engaged with the striker 53. As shown in FIG. 9, on the one hand, the third convex portion 64 of the first lever 54 is arranged so as to be projected upwardly from the upper face of the guiding groove 68 in the position in which the striker 53 is disengaged from the first convex portion 60 by pivoting the first lever 54 in the arrow b direction by means of the spring 67. As shown in FIG. 8, on the other hand, the second lever 55 is such that its second convex portion 66 is projected upwardly so as to close the guiding groove 68 in the position where its first convex portion 61 is engaged with the second convex portion 62 of the first lever 54 disposed at its engaged position. As shown also in FIG. 9, the first convex portion 61 of the second lever 55 is arranged so to be disengaged from the second convex portion 62 of the first lever 54 in the unlocking position in which the second convex portion 66 of the second lever 55 is located at the rearward end portion of the guiding groove 68.

The engaging pin 63 for locking operation is located at the forward end portion of the top member 3 and arranged so as to be slidable forward or backward along the guide rails 34 driven by means of the motor unit 8 (as shown in FIG. 19) disposed on the guide board 24, as will be described hereinafter. More specifically, as shown in FIG. 16, the engaging pin 63 is located at a position in the vicinity of a forward end of the roof aperture 2, i.e., the position being referred to sometimes as "forward end position), when the top member 3 is. located at the closing position D to close the aperture 2. When the top member 3 is located at the position K to open the roof aperture 2 as shown in FIG. 17, the engaging pin 63 is located at a position in the vicinity of a forward end of the second rail section 29 (hereinafter referred to sometimes as "intermediate position")

mounted on the board member 24, as shown in FIG. 8. As will be described hereinafter, the third convex portion 64 of the first lever 54 in the engaged position is located at a position to open the guiding groove 68. The pivotal movement of the first lever 54 in the direction as indicated by the arrow b is regulated by engaging its second convex portion 62 with the first convex portion 61 of the second lever 55. While the first convex portion 60 of the first lever 54 is engaged with the striker 53, the board member 24 is locked at the first accommodating position C on the roof in association with an engaging action of the engaging mechanism 51, thereby positioning the second rail section 29 in the longitudinal, transverse and vertical directions with respect to the first rail portion and locking the first and second rail sections 28 and 29.

As the engaging pin 63 for locking operation is slided to the intermediate position, the projection 103 (as shown in FIG. 12(b)) disposed on the sliding body 98 of the forward transfer unit Q comes into abutment with the limit switch 30 (as shown in FIG. 7) mounted on the board member 24 and this state is detected in a way as will be described hereinafter.

In transferring the board member 24 from th first accommodating position C to the second accommodating position H, the engaging pin 63 for locking operation is slided further backward from the intermediate position up to a rearward end portion of the guiding groove 68 (hereinafter referred to sometimes as "rearward end position"), as shown in FIG. 9. At this time, the projection 103 (FIGS. 12(a) and (b)) of the forward transfer unit Q is brought into contact with the limit switch 31 (FIG. 7) disposed on the board member 24 in the position rearward of the limit switch 30 and the rearward end position in which the engaging pin 63 is located is detected, whereby unlocking the board member 24 is confirmed. More specifically, as shown in FIG. 8, as the engaging pin 63 is transferred from the intermediate position further to the rearward end position as shown in FIG. 9, it comes into abutment with the second convex portion 66 of the second lever 55, thereby pivoting the second convex portion 66 thereof in the direction as indicated by the arrow d. The engagement of the first convex portion 61 of the second lever 55 with the second convex portion 62 of the first lever 54 is thus unlocked to thereby pivot the first lever 54 from the engaged position to the unengaged position. This operation unlocks the board member 24 and permits its backward movement in the direction as indicated by the arrow m in the drawing by means of the swinging mechanism S for transferal of the board member 24 to the second accommodating position H.

The unlocking operation of the locking mechanism 9a is implemented by sliding the forward transfer unit Q forward or backward along the second rail section 29 under control of the control unit 11, as have been described hereinabove. The motor unit 8 is used as a driving source for unlocking the locking mechanism 9a. It is thus unnecessary to provide another member for locking operation. Further, a frequency of occurrence of troubles can be reduced and the locking and unlocking operation of the top member 3 can be automatically implemented by operating the main switches 12a, 12b and 12c while the operator is seated. In order to smoothly implement the operation of a forward or backward movement of the forward transfer unit Q on the second rail sections 29 as will be described hereinafter, the operation of unlocking the board member 24 can be carried out in a smooth, stable and favorable manner. It is further possible to transfer the unlocked board member 24 together with the top member 3 in the second accommodating position H with high safety and certainty, thereby further improving safety and comfortableness.

In such a state that the board member 24 is transferred from the second accommodating position H to the first accommodating position C, each of the members is disposed in a positional relationship as shown in FIG. 9. In this state, the engaging pin 63 for locking operation is located at the rearward end position of the guiding groove 68. When the engaging pin 63 is transferred forward to the intermediate position—in other words, when the top member 3 is slided to the position K—the pin 63 is caused to be abutted again with the third convex portion 64 of the first lever 54, thereby pivoting the first lever 54 in the direction as indicated by the arrow a, locking the board member 24 by re-positioning the first lever 54 to the engaged position, and positioning the second rail section 29 with the first rail section 28. Therefore, when the board member 24 is returned to the first accommodating position C, the locking mechanism 9a is operated in the manner as have been described hereinabove in the position K when the top member 3 advances even if the alignment of the first rail section 28 with the second rail section 29 would not have been finished. Thus, relative positions of the first rail section 28 with respect to the second rail section 29 in longitudinal, transverse and vertical directions are adjusted with certainty and the locking of the two rail sections 28 and 29 is implemented.

Figure 10:
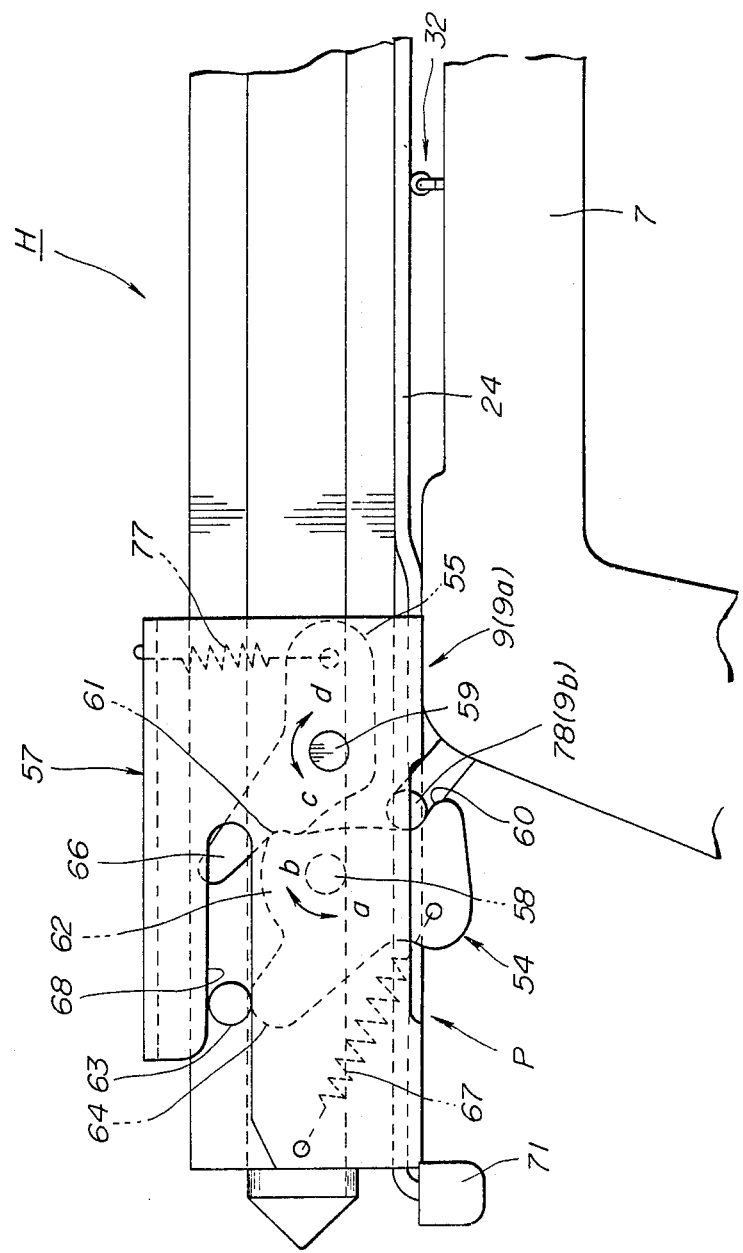
FIG. 10 is a side view showing a state in which the board member is locked on a support view located over the trunk lid.
Figure 11:
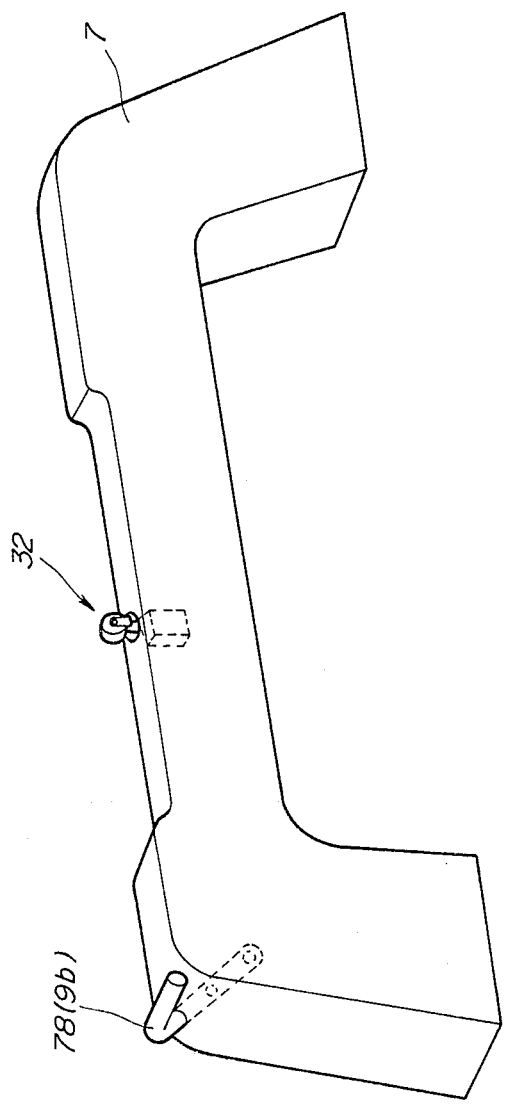
FIG. 11 is a perspective view showing the support base mounted on the trunk lid.

When the board member 24 is transferred to the second accommodating position H disposed on the support base 7 of the trunk lid 5, i.e., during accommodation of the top member 3, the locking mechanism 9a allows the engaging pin 63 for locking operation to be slided from the rearward end position to the intermediate position by means of the motor unit 8 and engaging the first convex portion 60 of the first lever 54 with a striker 78 mounted on the side of the support base 7 as shown in FIGS. 10, 11 and 18. This arrangement may be used as a locking mechanism 9b for the top member 3 in the second accommodating position H. The locked state at this time can be detected by means of the limit switch 30 while the unlocked state can be detected by the limit switch 31, as shown in FIG. 7. The limit switch 32 for detecting the placement or location of the board member 24 on the support base 7 is disposed in an approximately middle portion of one of the support bases 7 as shown in FIG. 11 in such a manner that its contactor comes into abutment with a bottom surface of the board member 24 as shown in FIG. 10, thereby generating an ON signal.

The locking and unlocking operation of the locking mechanism 9b in the second accommodating position H can be controlled by means of the control unit 11 in the manner as have been described hereinabove, and it may be carried out by means of forward or backward sliding operation of the forward transfer unit Q. As a driving source for this operation is used the motor unit 8. Therefore, the operation of the main switch 12b or 12c permits an automatic and smooth locking or unlocking operation of the top member 3 in the second accommodating position H. This further improves safety and comfortableness Referring now to FIGS. 16 to 19, the top member 3 to be slided to open or close the roof aperture 2 of the vehicle body comprises a hard top section member and a soft top section member, namely, a first panel 81, a second panel 82, and a third panel 83 with two pieces of canvases 84 and 85 disposed alternatively to connect the first and second panels 81, 82 and the second and third panels 82, 83, respectively. The first panel 81 has the broadest area and is disposed on the front side of the body, while the third panel 83 has the smallest area and is disposed on the rear side of the body. The second panel 82 has an intermediate area and is disposed in an intermediate position between the first and third panels 81 and 83. The third panel 83 is further secured to the rearward end portion 24b of the board member 24 as shown in FIG. 22. The first panel 81 and the second panel 82 are slidably connected through the forward transfer unit Q and the rearward transfer unit R (FIGS. 19(a), 14 and 15), respectively, to the guide rail 34. Thus the transfer operation of the forward transfer unit Q and the rearward transfer unit R allows the top member 3 to selectively take the position D and the position K. In other words, the top member 3 takes the position D that is a position to close the roof aperture 2 by stretching and expanding the first, second and third panels as shown in FIGS. 16 and 19, while it takes the position K that is a position to open the roof aperture 2 with the board member 3 placed on the board member 24 and accommodated in a folded state.

The forward transfer unit Q has the same basic construction as the rearward transfer unit R as shown in FIG. 12(a). The forward transfer unit Q is mounted to the first panel 81 of the top member 3 and the rearward transfer unit R is mounted to the second panel 82 thereof. As the forward transfer unit Q is slided backward along the guide rail 34, the first panel 81 is lifted at the starting time of sliding, thereby unsealing the state of abutting the first panel 81 with a sealing member disposed around the corresponding periphery of the aperture of the base frame 23. Likewise, the second panel 82 is lifted to unseal the abutment of the second panel 82 with the sealing member disposed along the corresponding periphery thereof as the rearward transfer unit R.

The forward transfer unit Q and the rearward transfer unit R will then be described with reference to FIGS. 12(a), 12(b) to 15.

As shown specifically in FIG. 12(a), the forward transfer unit Q comprises a sliding body 98 mounted slidably to the guide rail 34 through guide pins 96 and 97. The sliding body 98 is shown as in FIG. 19 to be driven through a cable 100 by means of the motor unit 8. More specifically, the motor unit 8 is mounted in an approximately middle portion of the board member 24 in its transverse direction, and the cable 100 to be reciprocatorily moved by the motor unit 8 is connected at its end to the sliding body 98. The clockwise or counterclockwise movement of the motor unit 8 allows the sliding body 98 to slide on the guide rail 34 in the longitudinal direction of the body 1. On an outer side face 98a of the sliding body 98 is provided a first guide groove 99 extending in the longitudinal direction of the body, and mounted three engaging pins, namely, the engaging pin 63 for locking operation, which is mounted to control operation of the position-regulating unit P as have been described hereinabove, a first engaging pin 101 for link operation, and a second engaging pin 102.

As shown in FIG. 12(b), the forward transfer unit Q is provided on its inner side face 98c with the projection 103 which is designed so as to come into contact with the limit switch 30 or 31 (as shown in FIG. 7) mounted on the board member 24. The limit switches 30 and 31 are disposed in such a positional relationship with respect to the projection 103 as will be described hereinafter. As shown in FIG. 12(a), a rearward end portion 98b of the sliding body 98 comprises an engaging portion 107 consisting of a first engaging face 105 and a second engaging face 106, and the engaging portion 107 is arranged so as to be engaged with a slide pin 134 of the rearward transfer unit R to cause the roof aperture 2 to be open by transferring the top member 3 to the position K on the board member 24 when the engaging pin 63 for locking operation comes to the intermediate position (as shown in FIG. 8). At this time, the limit switch 30 is caused to allow its contactor to come in touch with the projection 103, thereby generating an ON signal to the control unit 11. In the second accommodating position H, the top member 3 accommodated in the position K on the board member 24 is locked together on the support base 7.

When the engaging pin 63 for locking operation comes to the rearward end position, as shown in FIG. 9, by transferring the sliding body 98 further backward from its locked position, as have been immediately hereinabove, by means of the motor unit 8, the board member 24 located in the first accommodating position C or in the second accommodating position H is unlocked. This state can be detected by bringing the limit switch 31 into contact with the projection 103, thereby allowing the limit switch 31 to generate an ON signal to the control unit 11.

As shown further in FIG. 12(a), the sliding body 98 is "link-connected" with a bracket 88 of the first panel 81 of the top member 3 through three links, namely, a first link 92 with a second guide groove 100 in a shape of an approximately "smaller-than" ('<') symbol formed inside, a second link 93 in a band-like form, and a third link 94 with a third guide groove 101 formed inside as in a shape of an approximately "smaller-than" ('<') symbol with its sharp angle turned upside. The bracket 88 is mounted to a peripheral side portion 81a of the first panel 81. As shown specifically in FIGS. 12(a) and 13, the first link 92 is pivotably or swingably supported at its one end 92a on a forward end portion of the bracket 88 through a connecting pin 110 in such a state that the first engaging pin 101 is inserted into the second guide groove 108 of the first link 92. Furthermore, the first link 92 is engaged at its other end 92b with the first guide groove 99 through the third engaging pin 111, together with one end 94a of the third link 94. The second link 93 is pivotably or swingably supported at its one end 93a on a middle portion of the bracket 88 through a connecting pin 113 and it is connected at its other end 93b to an other end 94b of the third link 94 through a connecting pin 114 having a guide roller 112 so as to be relatively pivotable. And the second engaging pin 102 is engaged in the third groove 109 of the third link 94. As have been described hereinabove, the three links 92 to 94 constitutes a four-section link together with the bracket 88.

Referring now to FIG. 13, when the sliding body 98 is moved by means of the cable 100 so as to be located at the end of the guide rail 34, namely, in such a state that it is located at the forward end portion 28g of the first rail section 28, i.e., that the roof aperture is closed with the top member 3, the guide roller 112 is engaged in a first cut out portion 72 formed in the first rail section 28, thereby regulating a longitudinally sliding movement of the the forward transfer unit Q. In this state, the third engaging pin 111 is located on the rearward end side of the first guide groove 99 and the first engaging pin 101 is located on the forward end side of the second guide groove 108 while the second engaging pin 102 is located on the forward end side of the third guide groove 109. The second guide groove 108 in this state is disposed so as to extend in a vertical direction while the third guide groove 109 is disposed such that its forward half portion extends in an approximately horizontal direction and its rearward half portion extends in an obliquely downward direction.

As shown in FIGS. 12(a), 14 and 15, the rearward transfer unit R has substantially the same structure as the forward transfer unit Q as have been described hereinabove. The rearward transfer unit R has likewise a sliding body 122 which is slidably mounted to the guide rail 34 through a guide pin 121. The sliding body 122 has a first guide groove 123 on its outer side face 122a and is pivotably or swingably connected to a bracket 89 through a first link 126 having a second guide groove 124, a second link 127, and a third link 128 having a third guide groove 125. The bracket 89 is mounted to the second panel 82 of the top member 3.

When a first engaging pin 129 mounted on the side of the sliding body 122 is inserted into the second guide groove 124 of the first link 128 and when a second engaging pin 130 mounted on the side of the sliding body 122 is inserted into the third guide groove 125 of the third link 128, the rearward transfer unit R is disposed of in substantially the same manner as the forward transfer unit Q.

A structure which is peculiar to the rearward transfer unit R involves, firstly, an inclination portion of the third link 128 shorter than that of the third guide groove 109 of the forward transfer unit Q; secondly, an insertion of an engaging pin 131 connecting the second link 127 to the third link 128 into a third cut-out portion 74 formed in an upper flange 28d of the first rail section 28, as shown in FIG. 14, when the flexible top member 3 is located in the position D; and, thirdly, mounting of an arm 135 having an engaging pin 133 and a slide pin 134 to the forward end portion 122b of the sliding body 122 through a fulcrum pin 132. The engaging pin 133 of the arm 135 is inserted into a second cut-out portion 73 formed in a lower flange 28e of the first rail section 28 when the top member 3 is in the position D. In the positions other than the position D, it is inserted into a concave groove 28f of the first rail section 28 as shown in FIG. 15. The slide pin 134 is disposed always over an upper face 28c of the first rail section 28 astride the first rail section 28 in the transverse direction of the body. When the engaging pin 133 is in the concave groove 28f of the first rail section 28, it is arranged so as to be engageable into the engaging portion 107 of the forward transfer unit Q. When the top member 3 is in the position D, the rearward unit R is such that a sliding movement of the top member 3 in the longitudinal direction is regulated by engaging the engaging pin 131 into the second cut out portion 73. It is further to be noted herein that the rearward transfer unit R is blocked from sliding in the longitudinal direction and that it is provided with no driving means, unlike the forward transfer unit Q.

The top member 3 connected to the guide rail 34 will be operated to open or close the roof aperture by means of the forward and rearward transfer units Q and R in such a manner as will be described hereinafter.

Figure 24:
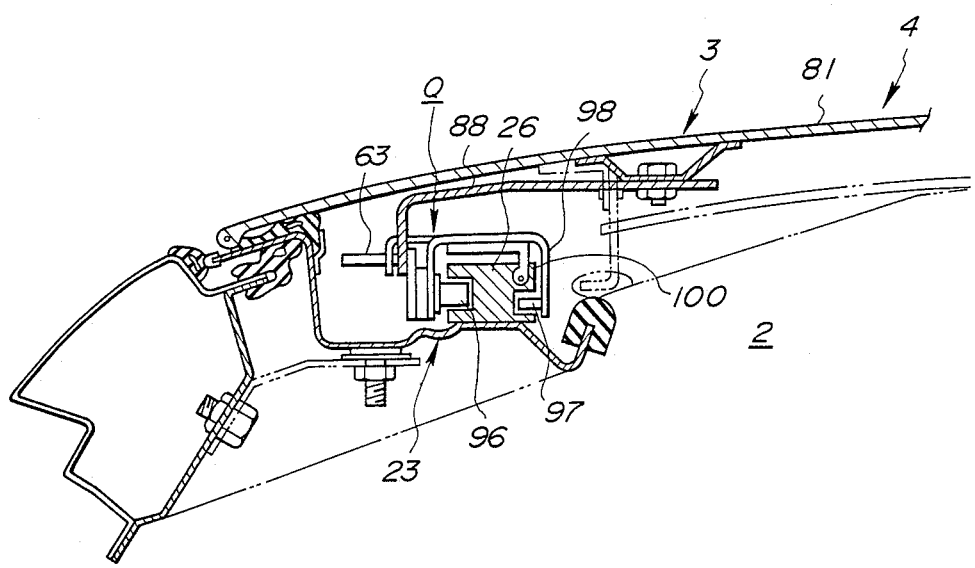
FIG. 24 is a cross-sectional view taken along the line XXIV—XXIV of FIG. 19.

First, when the top member 3 is in the position D (as shown in FIGS. 16 and 19), the forward transfer unit Q is located at the forward end portion 28g of the first rail section 28, as shown in FIG. 13, in such a state that the first panel 81 is disposed substantially in parallel to and close to the first rail section 28 and that it is sealed at its outer periphery with the base frame 23 (FIG. 24). As shown in FIGS. 14 and 19, the rearward transfer unit R is located in a vicinity of the rearward end portion 28a of the first rail section 28, while the second panel 82 is disposed substantially in parallel to and close to the first rail section 28, like the first panel 81. In the position D in which the top member 3 is closed, the forward and rearward transfer units Q and R are engaged with the guide rail 34 in a vertical relationship so that, even if a sucking action would work upon the top member 3, the top member 3 can be effectively prevented from fluttering, thereby improving durability of the top member 3.

When the top member 3 is operated to be released from this state, namely, when the cable 100 is pulled backward by means of the motor unit 8, the sliding body 98 of the forward transfer unit Q is slided toward the rear of the body 1 relative to the bracket 88, thus transferring the third engaging pin 111 within the first guide groove 99 from the forward end side toward the rearward end side. During a first half period of this transfer, the second engaging pin 102 is allowed to transfer on the inclination portion of the third guide groove 109 toward its rearward end side, and this allows the third link 94 to be pivoted upward about the third engaging pin 111, while the guide roller 112 is caused to be released from the first cut-out portion 72 (FIG. 12(a)) of the first rail section 28, thereby transferring it onto the upper face 28c of the first rail section 28. This is the state as shown in FIG. 14. In this state, the first panel 81 is lifted up as a whole and the state in which it is abutted with the peripheral edge portion of the base frame 23 is disengaged. It is to be noted in this embodiment that a difference between vertical positions of the first link 92 when it is pivoted in the second guide groove 108 is set to be larger than a difference between vertical positions of the third link 94 when it is pivoted within the third guide groove 109, thereby allowing the bracket 88 to be inclined forward.

When the cable 100 is further pulled backward, the forward transfer unit Q is slided toward the rear of the body in such a posture as shown in FIG. 14, while the first canvas 84 is being folded. As the forward transfer unit Q comes in front of the rearward transfer unit R, the sliding pin 134 mounted on the arm 135 of the rearward transfer unit R is inserted into the engaging portion 107 of the forward transfer unit Q. The arm 135 is then pivoted upwardly while being guided on the first engaging face 105 as the forward transfer unit Q slides. As a result, the engaging pin 133 is removed from the second cut-out portion 73 of the first rail section 28 and transferred into the concave groove 28f, thereby integrally connecting the forward transfer unit Q to the rearward transfer unit R.

As the forward transfer unit Q is transferred further in the rearward direction, the sliding body 122 of the rearward transfer unit R is slided further toward the rear of the body, too, relative to the bracket 89 as shown in FIG. 15, thereby lifting the second panel 82 and allowing it to be released and separated from the sealed face of the base frame 23, like the forward transfer unit Q. At this time, in the forward transfer device Q, the the second panel 82 becomes approximately parallel to the first rail section 28 by appropriately setting a relative relationship between a difference of positional heights of the first engaging pin 129 of the first link 126 prior to and subsequent to its pivot with that of the third guide groove 125 of the third link 128. Accordingly, in such a state in which the forward transfer unit Q is connected to the rearward transfer unit R, the first panel 81 is inclined at an angle different from the second panel 82 so that the fist and second panels 81 and 82 are allowed to be folded and superposed while ensuring a sufficient space between the two panels for accommodating the first canvas 34 of the top member 3.

When the cable 100 is pulled further backward, the forward transfer unit Q and the rearward transfer unit R are integrally slided backward from the first rail section 28 to the second rail section 29 while folding the second canvas 85. The forward and rearward transfer units Q and R are then accommodated on the board member 24 located in the position C. In this state, the first, second and third panels 81, 82, 83 are folded in order in a superposed state with the first canvas 84 folded between the first and second panels 81 and 82 and with the second canvas 85 folded between the second and third panels 82 and 83. As shown in FIGS. 16 to 18, it is to be noted that a guide member 50 is provided at the rearward end portions of the first and second panels 81 and 82 in order to prevent the first and second canvases 84 and 85, respectively, from being folded at sharp angles.

When the top member 3 is operated from its open state to close the roof aperture, the forward transfer unit Q and the rearward transfer unit R are transferred together in a joined state until the rearward transfer unit R reaches a given position in the position D in which the aperture is full closed with the top member 3, namely, until the engaging pin 133 of the rearward transfer unit R reaches the position of the second cut-out portion 73 of the first rail section 28 (FIG. 14). When the engaging pin 133 is inserted into the second cut-out portion 73 of the first rail section 28, then the arm 135 is caused to be pivoted downward, thereby removing or disengaging the slide pin 134 from the engaging portion 107 of the forward transfer unit Q and disconnecting a connection of the forward transfer unit Q to the arm 135 of the rearward transfer unit R. Thus, thereafter, only the forward transfer unit Q advances forward up to its original position while leaving the rearward transfer unit R behind, and the top member 3 is aligned in the position D. In other words, the top member 3 is operated to close the aperture while its parts to be stretched or expanded on the rear side of the body 1 are developed in order earlier than the other to be expanded next.

As have been described hereinabove, a series of operations of the mechanical system of the flexible top according to the present invention include operation to open or close the top member 3, operation to lock or unlock the board member 24 with the top member 3 accommodated thereon in the first accommodating position C disposed on the roof 4 or in the second accommodating position H disposed on the trunk lid 5, and operation to transfer the board member 24 between the first and second accommodating positions C and H. In accordance with the present invention, this series of operations can be implemented by the motor unit 8 or 10 driven by means of the main switch 11 in response to an instruction of the control unit 11. Accordingly, as have been described hereinabove, the operator does not need to implement locking or unlocking operation of the top member 3, unlike conventional ones, by taking the trouble to get out from the vehicle, thereby improving comfortableness and safety. In particular, the unlocking operation can be implemented with readiness, certainty and smoothness by transferring the the top member 3 backward in a given distance from the position K in which it is accommodated. Therefore, no additional member is required for unlocking and an easy control can be made so that troubles are unlikely to occur and operability of the canvas top system can be remarkably improved.

Furthermore, the top member 3 can be evacuated from the position in which it interferes with or blocks the opening of the trunk lid 5 when the trunk locking means 13 is unlocked by the top-evacuating system disposed in the canvas top system in the manner as have been described hereinabove, so that damages and injuries of the top member 3, the board member 24, and the trunk lid 5 can be avoided with certainty while improving safety. This certainly serves as enhancing a commercial value as a vehicle.

In this embodiment, it is to be noted that the trunk opener switch 6 may be used as a trunk lid-unlocking detection means, in place of the trunk-unlocking limit switch 15.

It is to be understood that the foregoing text and drawings relate to embodiments of the present invention given by way of examples but not limitation. Various other embodiments and modifications are possible within the spirit and scope of the present invention.

What is claimed is:

1. A flexible top apparatus of a vehicle in which:
    a roof panel connected to a vehicle body through at least a pair of left-hand and right-hand front pillars and a pair of left-hand and right-hand rear pillars;
    said roof panel comprising a front header, a pair of left-hand and right-hand roof side rails and a rear header, which are disposed so as to enclose a roof aperture;
    a rear window glass panel being fixed to said pair of left-hand and right-hand rear pillars and said rear header; and
    a flexible top having means for being foldable or extendable in a longitudinal direction of the vehicle body and having an area as large in size as said roof aperture so as to close said roof aperture when extended in the longitudinal direction thereof;
    wherein said flexible top in an extended state is in abutment at its forward end portion with said front header, at its left-hand and right-hand side end portions with said left-hand and right-hand roof side rails, respectively, and at its rearward end portion with said rear header when said roof aperture is closed with said flexible top;
    said flexible top apparatus characterized in that said flexible top in a folded state selectively takes either a first position or a second position, said first position being located in a position over a trunk lid and said second position being located in a position where the flexible top is evacuated from said first position so as to cause no interference with the trunk lid when the trunk lid is opened.

2. A flexible top apparatus as claimed in claim 1, further comprising:
    said means for folding and extending including driving means for transferring said flexible top between said first position and said second position;
    locking means for locking the trunk lid in a closed state;
    unlocked-state detecting means for detecting a state in which the trunk lid is unlocked; and
    evacuation control means for evacuating said flexible top from said first position to said second position when the trunk lid is unlocked.

3. A flexible top apparatus as claimed in claim 2, wherein:
    said flexible top comprises at least a hard front panel portion constituting a forward end portion of said flexible top and a hard rear panel portion constituting a rearward end portion thereof;
    wherein said front panel portion and said rear panel portion are connected to each other with a flexible sheet; and
    said flexible top is foldable in such a manner that said front panel portion is superposed over said rear panel portion.

4. A flexible top apparatus as claimed in claim 3, wherein said flexible top is folded over a hard board member and said board member is movable between said first position and said second position.

5. A flexible top apparatus as claimed in claim 4, wherein:
    said first position is located on the trunk lid; and
    said board member is placed on said trunk lid when said flexible top is located in said first postion.

6. A flexible top apparatus as claimed in claim 5, wherein said second position is located at a rearward end portion of said roof panel.

7. A flexible top apparatus as claimed in claim 5, wherein said board member is connected to the body through a link.

8. A flexible top apparatus as claimed in claim 7, further comprising first locking means for locking said flexible top in said first position; and second locking means for locking said flexible top in said second position.

9. A flexible top apparatus as claimed in claim 1, wherein said flexible top in a folded state takes a third position located at a rearward end portion of said roof panel.

10. A flexible top apparatus as claimed in claim 9, further comprising:
    first driving means for transferring said flexible top between said first position and said second position;
    locking means for locking said trunk lid in a closed state;
    unlocked-state detecting means for detecting a state in which said trunk lid is unlocked;
    evacuation control means for evacuating said flexible top from said first position to said position (C) when said trunk lid is unlocked;
    second driving means for extending or folding said flexible top to close said roof aperture by extending said flexible top or to open said aperture by folding said flexible top in said third postion;
    vertical transfer control means for controlling said first driving means; and
    opening-closing control means for controlling said second driving means.

11. A flexible top apparatus as claimed in claim 10, wherein:

said flexible top comprises at least a hard front panel portion constituting a forward end portion of said flexible top and a hard rear panel portion constituting a rearward end portion thereof;

wherein said front panel portion and said rear panel portion are connected to each other with a flexible sheet; and said flexible top is foldable in such a manner that said front panel portion is superposed over said rear panel portion.

12. A flexible top apparatus as claimed in claim 11, wherein said flexible top is folded over a hard board member and said board member is movable between said first position and said second position.

13. A flexible top apparatus as claimed in claim 12, wherein:

said first position is located on the trunk lid 5; and said board member is supported on said trunk lid when said flexible top is located in said first postion.

14. A flexible top apparatus as claimed in claim 13, wherein said second position is located at a rearward end portion of said roof panel in the same manner as said third position.

15. A flexible top apparatus as claimed in claim 13, wherein said board member is connected to the body through a link.

16. A flexible top apparatus as claimed in claim 12, wherein said second driving means comprises a motor and a drive wire connected at its end portion to said front panel portion and moving reciprocatorily by said motor.

* * * * *